United States Patent
Kabasawa

[11] Patent Number: 5,933,400
[45] Date of Patent: Aug. 3, 1999

[54] DISK APPARATUS HAVING A DISK TRAY ADAPTED FOR TWO DIFFERENT TYPES OF OPTICAL DISK

[75] Inventor: Hidetoshi Kabasawa, Ogawamachi, Japan

[73] Assignee: Teac Corporation, Tokyo, Japan

[21] Appl. No.: 08/987,648

[22] Filed: Dec. 9, 1997

[30] Foreign Application Priority Data

Dec. 25, 1996 [JP] Japan ..................... 8-346120
Dec. 25, 1996 [JP] Japan ..................... 8-346122

[51] Int. Cl.$^6$ .................. G11B 33/02; G11B 17/04
[52] U.S. Cl. ........................ 369/77.2; 360/99.06
[58] Field of Search ............... 360/99.06, 99.07; 369/75.2, 77.1, 77.2, 178, 180, 201, 202, 212, 222, 256, 270, 271

[56] References Cited

U.S. PATENT DOCUMENTS

| | | | |
|---|---|---|---|
| 5,299,185 | 3/1994 | Sakurai et al. | 369/75.2 |
| 5,812,511 | 9/1998 | Kawamura et al. | 369/77.2 |
| 5,867,338 | 2/1999 | Ohira et al. | 369/75.2 |

FOREIGN PATENT DOCUMENTS 7161112  6/1995  Japan.

*Primary Examiner*—David L. Ometz
*Assistant Examiner*—Angel Castro
*Attorney, Agent, or Firm*—Ladas & Parry

[57] ABSTRACT

A disk apparatus includes a disk tray which holds one of a disk and a disk cartridge at a loaded position. The disk has a first thickness and the cartridge has a second, greater thickness. A plurality of disk supporting members are provided on the tray and support one of the disk and the cartridge thereon, each disk supporting member including a rotatable shaft and a supporting plate, the supporting plate extending parallel to the shaft and being rotatable around a rotating axis of the shaft between a vertical position, located above the shaft, and a horizontal position, located sideways of the shaft. An interlock unit is provided on the tray and rotates the supporting plate of each disk supporting member around the rotating axis of the shaft from the vertical position to the horizontal position when the cartridge is inserted in the tray. The supporting plate at the vertical position supports the disk thereon when the disk is inserted in the tray, and the supporting plate is set at the horizontal position when the cartridge is inserted in the tray.

12 Claims, 24 Drawing Sheets

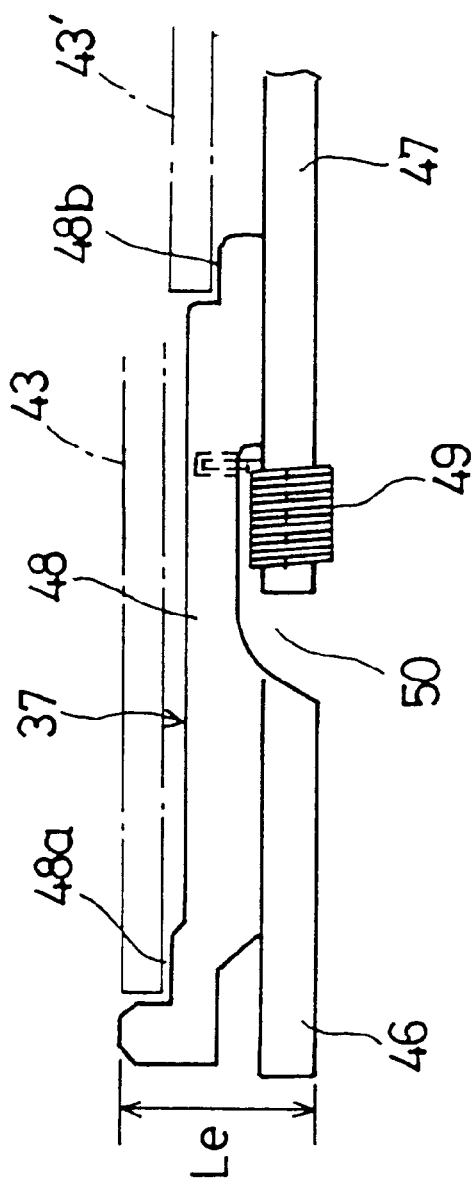
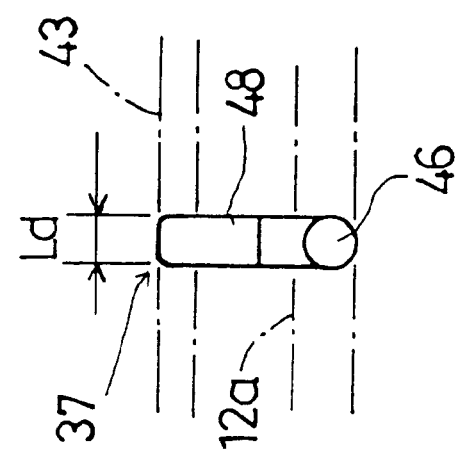

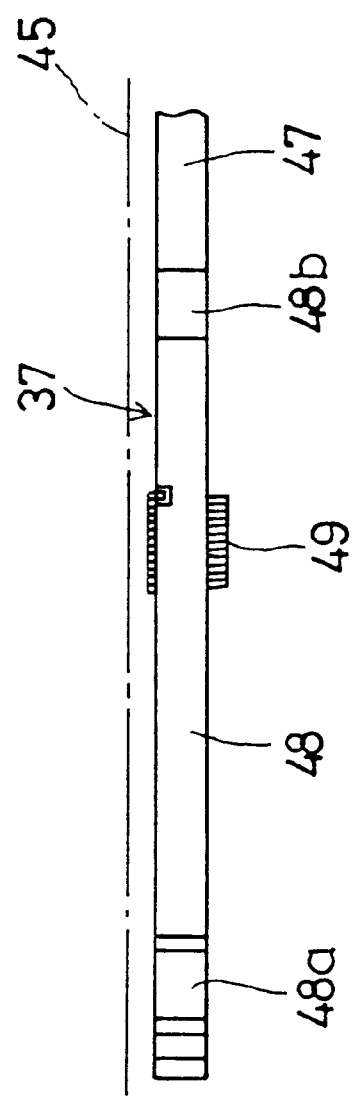
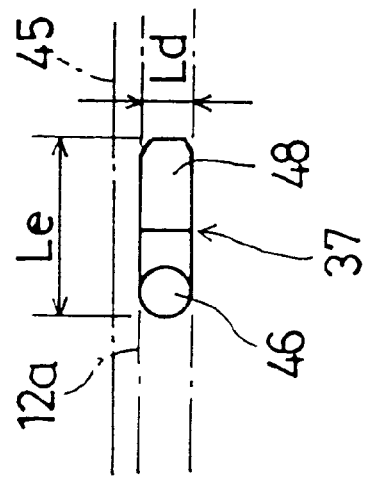

DISK APPARATUS HAVING A DISK TRAY ADAPTED FOR TWO DIFFERENT TYPES OF OPTICAL DISK

BACKGROUND OF THE INVENTION (1) Field of the Invention

The present invention relates to a disk apparatus in which one of a CD-ROM and a disk cartridge is held on a disk tray at a loaded position and reproduction or recording for a related disk is carried out by using a pickup unit.

(2) Description of the Related Art

An optical disk is inserted into an optical disk drive, and the optical disk drive reads information from or writes information to the optical disk by using an optical pickup unit. The optical pickup unit emits a light beam to the disk and receives reflection beams from the disk to which the emission beam is applied. When the optical disk drive is operating in a reading mode, the optical pickup unit detects pits in a track of the disk from the reflection beams in order to read data from the disk.

Recently, there are two major types of optical disk drive: a read-only type and a rewritable type. The read-only optical disk drives read information from an optical disk, such as CD (compact disk) and CD-ROM (compact disk-read-only memory). The rewritable optical disk drives can read information from and write information to an optical disk. Among the rewritable optical disk drives are a write-once disk system and an erasable disk system. The write-once disk system accesses an optical disk such as a CD-R (compact disk-recordable), and can write data to the disk once only. The erasable disk system accesses an optical disk, such as a PD (phase-change material disk) or CD-RW (compact disk-rewritable), and can write data to the disk many times.

Existing optical disk drives are provided for accessing only one of the above-mentioned optical disk types. In order to allow both the read-only disk (CD, CD-ROM) and the rewritable disk (CD-R, PD, CD-RW) to be accessed, it has been necessary to use two or more of the existing optical disk drives in combination. Recently, in order to eliminate such inconvenience, development has started on an optical disk apparatus in which either one of the read-only disk and the rewritable disk can be held on a disk tray at a loaded position and reproduction or recording with respect to a related disk can be carried out. A conventional disk apparatus of this type is known. In the conventional disk apparatus, one of a CD-ROM and a PD disk cartridge can be held on a disk tray at a loaded position and reproduction or recording with respect to a related disk can be carried out.

FIG. 26 shows a disk tray 1 of the above-mentioned conventional disk apparatus. On the disk tray 1, either a CD-ROM 9 or a PD disk cartridge 10 can be held at a loaded position. FIG. 27 is a cross-sectional view of the disk tray 1 on which the CD-ROM 9 is placed. FIG. 28 is a cross-sectional view of the disk tray 1 on which the disk cartridge 10 is placed. The disk cartridge 10 contains an optical disk 10a as shown in FIG. 28.

As shown in FIGS. 26–28, the disk tray 1 has a double-tray structure including an inner tray 2 on which the CD-ROM 9 is placed and an outer tray 3 on which the disk cartridge 10 is placed. The inner tray 2 is provided within the outer tray 3 such that the inner tray 2 is vertically movable between a lowered position and a raised position.

The inner tray 2 includes a first circular recess 2a to which a disk having an 8-cm diameter is fitted, and a second circular recess 2b to which another disk having a 12-cm diameter is fitted.

In the disk tray 1 of the conventional disk apparatus, the inner tray 2 is normally set at the raised position as shown in FIG. 27, and, when the CD-ROM 9 is inserted in the disk tray 1, the CD-ROM 9 is supported on the inner tray 2 at the raised position. When the disk cartridge 10 is inserted in the disk tray 1, the inner tray 2 is vertically moved to the lowered position as shown in FIG. 28, and the disk cartridge 10 is supported on the outer tray 3.

In the disk tray 1, a tray moving mechanism 4 is provided to vertically move the inner tray 2 within the outer tray 3. The tray moving mechanism 4 includes a pair of pressing rods 5, a pair of helical compression springs 6, two pairs of guide grooves 7, and two pairs of pins 8.

The pressing rods 5 and the helical compression springs 6 are provided on a rear wall of the outer tray 3. The pressing rods 5 press the inner tray 2 in a direction indicated by the arrow "A" in FIGS. 26–28. The springs 5 exert an actuating force on the pressing rods 6 such that the inner tray 2 is pressed by the pressing rods 5 in the direction "A".

The guide grooves 7 are provided at two positions on each of right and left side walls of the outer tray 3. The pins 8 are fixed to each of right and left side walls of the inner tray 2 at two positions which correspond to the positions of the guide grooves 7. The pins 8 extending sideways from the inner tray 2 are fitted in the guide grooves 7.

As the inner tray 2 is pressed by the pressing rods 5 in the direction "A" due to the actuating force of the springs 6, the pins 8 are normally placed at upper ends of the guide grooves 7. Therefore, the inner tray 2 is normally set at the raised position as shown in FIG. 27. When the CD-ROM 9 is inserted in the disk tray 1, the CD-ROM 9 is supported on the inner tray 2 at the raised position.

When the disk cartridge 10 is inserted in the disk tray 1, the inner tray 2 is vertically moved to the lowered position by the disk cartridge 10 as shown in FIG. 28. At this time, the pins 8 are moved downwardly along the guide grooves 7 to lower ends of the guide grooves 7 by the disk cartridge 10, and the pressing rods 5 are pushed against the actuating force of the springs 6 in a direction indicated by the arrow "B" in FIG. 28 by the downward movement of the inner tray 2. Therefore, the disk cartridge 10 is supported on the outer tray 3.

As shown in FIG. 27 and FIG. 28, in the disk tray 1 of the conventional disk apparatus, the inner tray 2 is vertically moved between the raised position and the lowered position within the outer tray 3, such that the loaded position for the CD-ROM 9 and the loaded position for the disk 10a of the disk cartridge 10 are the same as each other.

However, in the above-described disk tray 1, the inner tray 2 has to be set at the lowered position and included beneath the disk cartridge 10 in the outer tray 3 when the disk cartridge 10 is inserted. Therefore, as shown in FIG. 28, it is necessary that the entire thickness "La" of the disk tray 1 is greater than a sum of a thickness "Lb" of the disk cartridge 10 and a thickness "Lc" of the inner tray 2 (La>Lb+Lc).

In the conventional disk apparatus, it is impossible to reduce the entire thickness of the disk tray 1 (or the thickness "La" of the outer tray 3) below the sum of the thickness "Lb" of the disk cartridge 10 and the thickness "Lc" of the inner tray 2. This makes it difficult to provide a thin structure for an optical disk drive installed in a personal computer. In recent years, notebook-size personal computers having a built-in optical disk drive as standard equipment are widespread, and there is a demand for reducing the entire thickness of the built-in optical disk drive for use in the notebook-size computers.

SUMMARY OF THE INVENTION

An object of the present invention is to provide an improved disk apparatus in which the above-described problems are eliminated.

Another object of the present invention is to provide a disk apparatus which provides a thin structure for an optical disk drive installed in a notebook-size computer while a disk tray is capable of holding one of a CD-ROM and a PD disk cartridge on a disk tray at a disk-loaded position.

The above-mentioned objects of the present invention are achieved by a disk apparatus which comprises: a disk tray which holds one of a disk and a disk cartridge at a loaded position, the disk having a first thickness, the cartridge having a second, greater thickness; a plurality of disk supporting members provided on the tray which support one of the disk and the cartridge thereon, each of the plurality of disk supporting members comprising a rotatable shaft and a supporting plate, the supporting plate extending parallel to the shaft and being rotatable around a rotating axis of the shaft between a vertical position, located above the shaft, and a horizontal position, located sideways of the shaft; and an interlock unit provided on the tray which rotates the supporting plate of each of the plurality of disk supporting members around the rotating axis of the shaft from the vertical position to the horizontal position when the cartridge is inserted in the tray, wherein the supporting plate at the vertical position supports the disk thereon when the disk is inserted in the tray, and the supporting plate is set at the horizontal position when the cartridge is inserted in the tray.

The above-mentioned objects of the present invention are achieved by a disk apparatus which comprises: a disk tray which holds one of a disk and a disk cartridge at a disk-loaded position, the disk having a first thickness, the cartridge having a second, greater thickness, the tray having a cartridge holding surface at a predetermined height on the tray, the tray being movable between a disk-change position and the disk-loaded position; and a plurality of disk supporting members, provided on the tray, which support one of the disk and the cartridge thereon, each of the plurality of disk supporting members comprising a rotatable shaft and a disk support plate, the disk support plate having a disk contact surface to support an outer periphery of the disk thereon, the disk support plate being rotatable around a rotating axis of the shaft between a disk-support position, located above the cartridge holding surface, and a horizontal position, located below the cartridge holding surface, wherein the disk support plate is rotated from the disk-support position to the horizontal position by the cartridge when the cartridge is inserted in the tray, the disk support plate at the horizontal position being placed below the cartridge holding surface in the tray.

In the disk apparatus of the present invention, it is only required that an entire thickness of the disk tray is greater than a sum of a thickness of the disk cartridge and a thickness of the supporting plate. In the conventional disk tray, the entire thickness of the outer tray has to be greater than the sum of the thickness of the disk cartridge and the thickness of the inner tray. The thickness of the inner tray is rather greater than the thickness of the supporting plate as the height of the disk supporting member which is set at the horizontal position. The entire thickness of the disk tray according to the present invention can be reduced to a thickness rather smaller than the entire thickness of the conventional disk tray. Therefore, the disk apparatus of the present invention is effective in providing a thin structure for an optical disk drive installed in a notebook-size computer while the disk tray is capable of holding one of the CD-ROM and the disk cartridge at the disk-loaded position.

BRIEF DESCRIPTION OF THE DRAWINGS

The above and other objects, features and advantages of the present invention will be more apparent from the following detailed description when read in conjunction with the accompanying drawings in which:

FIG. 6A and FIG. 6B are diagrams for explaining a condition of a disk supporting member which is set at a vertical position;

FIG. 7A and FIG. 7B are diagrams for explaining a condition of the disk supporting member which is set at a horizontal position;

DETAILED DESCRIPTION OF THE PREFERRED EMBODIMENTS

A description will now be given of the preferred embodiments of the present invention with reference to the accompanying drawings.

Figure 1:
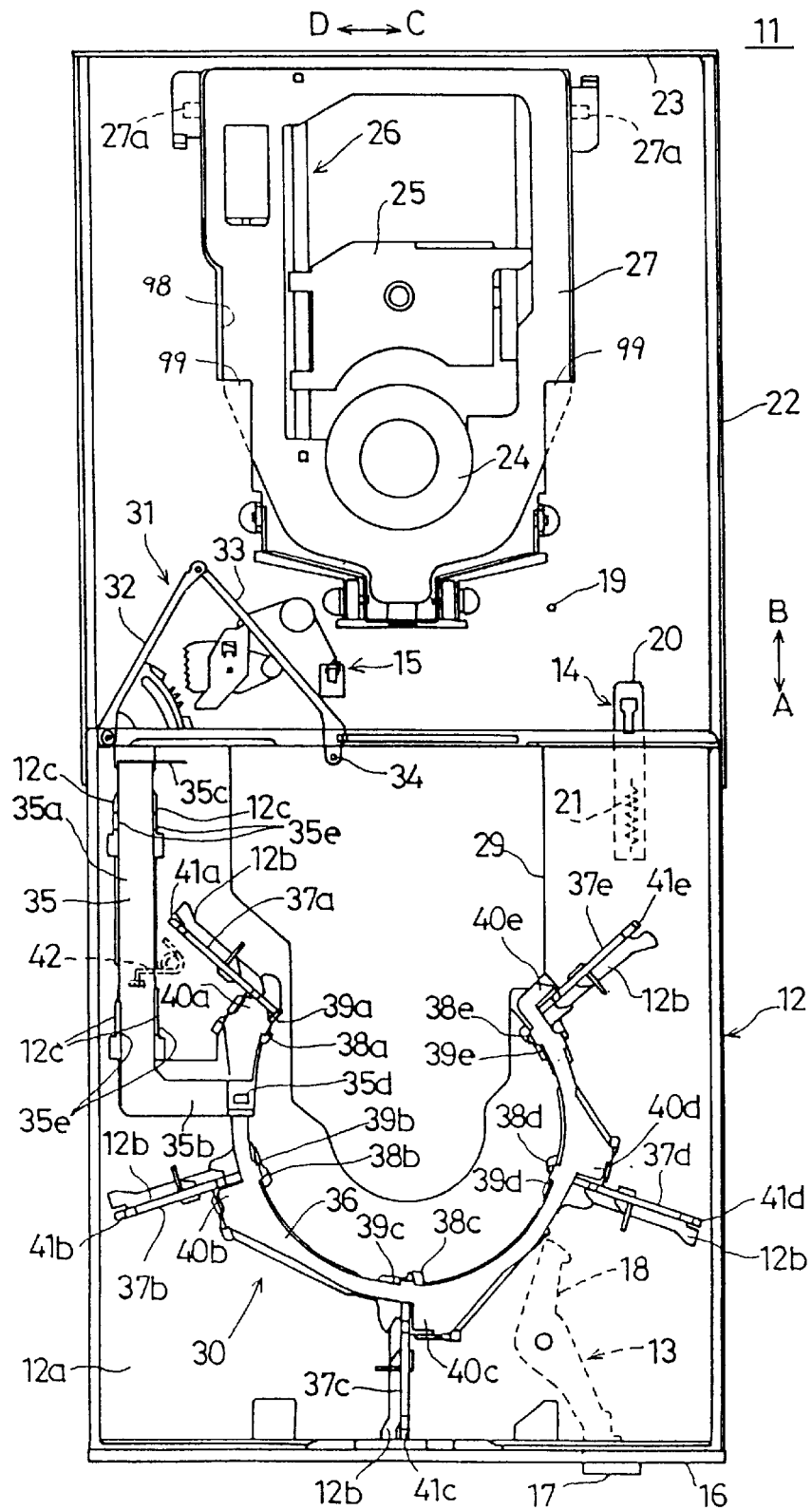
FIG. 1 is a top view of a first embodiment of a disk apparatus of the present invention in which a disk tray is pulled open.
Figure 2:
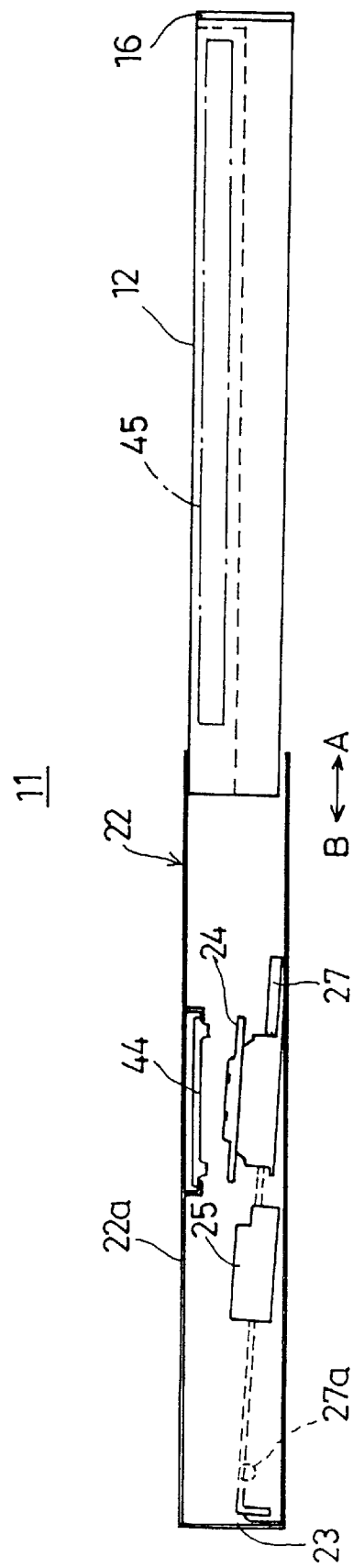
FIG. 2 is a cross-sectional view of the disk apparatus of FIG. 1.
Figure 3:
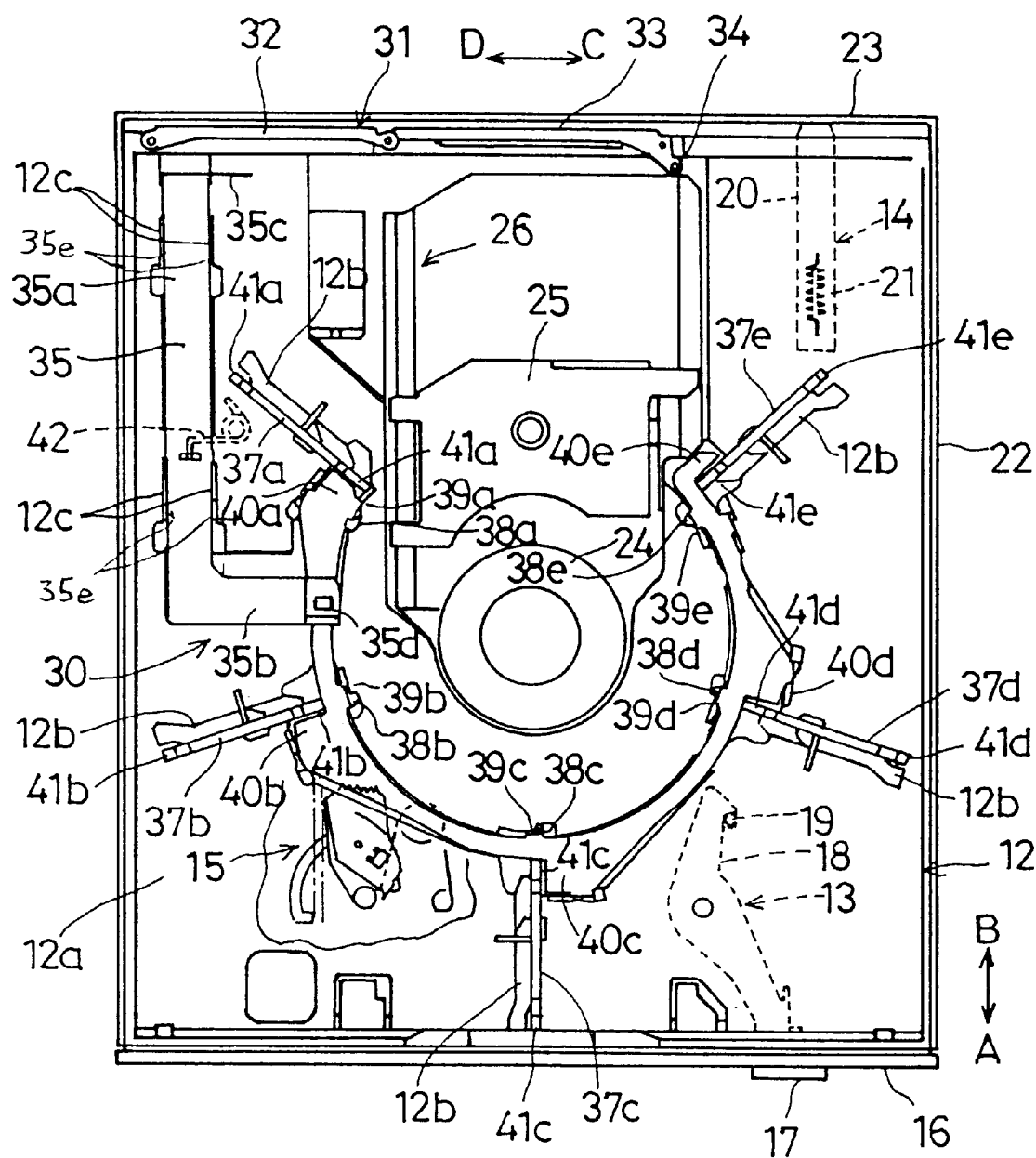
FIG. 3 is a top view of the disk apparatus of FIG. 1 in which the disk tray is moved to a disk-loaded position.
Figure 4:
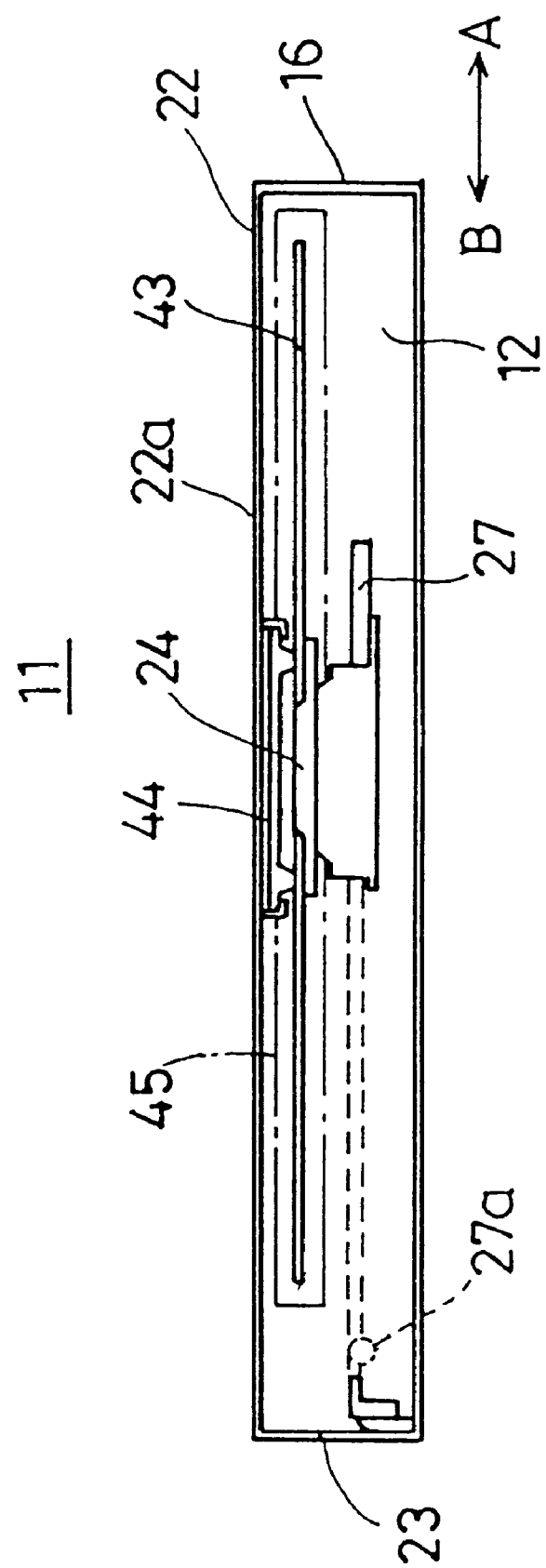
FIG. 4 is a cross-sectional view of the disk apparatus of FIG. 3.

FIG. 1 shows a first embodiment of a disk apparatus 11 of the present invention in which a disk tray is pulled open. FIG. 2 is a cross-sectional view of the disk apparatus 11. FIG. 3 shows the disk apparatus 11 in which the disk tray is set at a loaded position. FIG. 4 is a cross-sectional view of the disk apparatus of FIG. 3.

The disk apparatus 11 is an external disk drive installed in a personal computer (not shown).

The disk apparatus 11 comprises a disk tray 12 on which one of a CD-ROM and a PD disk cartridge 45 is held. The disk tray 12 is provided such that the disk tray 12 is movable between a disk-loaded position and a disk-change position in one of an ejecting direction, indicated by the arrow "A" in FIGS. 1–4, and an inserting direction, indicated by the arrow "B" in FIGS. 1–4.

The CD-ROM is a type of optical disk and the CD-ROM is designated by reference numeral 43. The disk cartridge 45 contains an optical disk therein and the disk of the disk cartridge 45 is also designated by reference numeral 43.

The disk apparatus 11 comprises a tray locking unit 13 which locks the disk tray 12 at a loaded position, a tray pressing unit 14 which presses the disk tray 12 in the ejecting direction A, and a shutter open/close unit 15 which opens and closes a shutter of the disk cartridge 45.

The tray locking unit 13 unlocks the disk tray 12 when an eject button 17 provided on a front bezel 16 is pressed by an operator. When the eject button 17 is pressed, a lock lever 18 provided on a back side of the disk tray 12 is disconnected from a connecting pin 19 provided on a bottom surface of a chassis 22, so that the tray locking unit 13 unlocks the disk tray 12.

The tray pressing unit 14 includes a pressing lever 20 and a helical spring 21. When the tray locking unit 13 unlocks the disk tray 12, the pressing lever 20 pushes a rear end wall 23 of the chassis 22 due to an actuating force of the spring 21 so that the disk tray 12 is moved in the ejecting direction A by the pressing lever 20 toward the disk-change position. This operation of the tray pressing unit 14 allows the operator to pull the disk tray 12 open from the chassis 22 and set the disk tray 12 at the disk-change position as shown in FIG. 1.

On the bottom surface of the chassis 22, a traverse unit 27 is provided such that the traverse unit 27 is vertically rotatable around a shaft 27a, as shown in FIG. 2 and FIG. 4. The traverse unit 27 includes a turntable 24, an optical pickup unit 25 and a pickup drive 26 which are provided on the traverse unit 27. The turntable 24 is rotated by a motor (not shown) so as to rotate an optical disk on the turntable 24 around a center of the turntable 24. The pickup unit 25 is used to read data from or write data to a recording layer of the optical disk. The pickup drive 26 controls operation of the pickup unit 25.

The shaft 27a of the traverse unit 27 is provided at a rear end portion of the chassis 22, and the traverse unit 27 is provided such that a front portion of the traverse unit 27 is vertically moved up and down within the internal space of the chassis 22 in response to the rearward and forward movements of the disk tray 12. Specifically, the front portion of the traverse unit 27 is moved down during the forward movement of the disk tray 12 wherein the disk tray 12 is moved forward to the disk-change position, and it is moved up during the rearward movement of the disk tray 12 wherein the disk tray 12 is moved rearward to the disk-loaded position.

A base plate of the chassis 22 includes an opening 98 which has a configuration in conformity with the turntable 24, the pickup unit 25 and the pickup drive 26. The opening 98 has a pair of contact portions 99 provided at right and left side edges of the opening 98. The contact portions 99 extend inwardly from the side edges of the opening 98. When the front portion of the traverse unit 27 is moved up, the traverse unit 27 is brought into contact with the contact portions 99 so that the traverse unit 27 is positioned at a read/write position.

As shown in FIG. 4, the disk tray 12 is set at the disk-loaded position and the traverse unit 27 is moved up, and the turntable 24 provided on the traverse unit 27 brings the disk 43 (one of the CD-ROM and the disk cartridge 45) on the disk tray 12 into contact with a clamper 44. The clamper 44 is provided on a top plate 22a of the chassis 22, and the disk 43 at this time is clamped between the turntable 24 and the clamper 44. The pickup unit 25 is used to read data from or write data to a recording layer of the disk 43.

The disk tray 12 has a cartridge holding surface 12a on which the disk cartridge 45 is placed. The cartridge holding surface 12a includes an opening 29 which has a configuration in conformity with the turntable 24, the pickup unit 25 and the pickup drive 26.

An interlock unit 30 is provided on the cartridge holding surface 12a around the periphery of the opening 29. The interlock unit 30 serves to support the outer peripheral surface of the CD-ROM when the CD-ROM is inserted, and serves to actuate a plurality of disk supporting members (which will be described later) to respective horizontal positions when the disk cartridge 45 is inserted, so as to support the disk cartridge 45 on the disk tray 12.

Figure 5A:
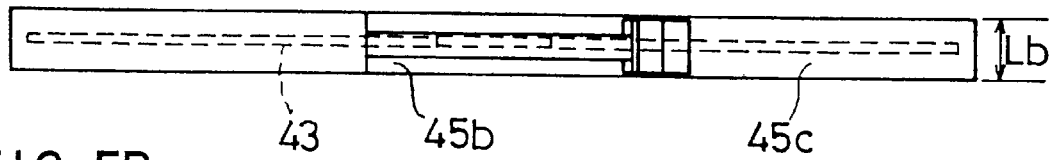
FIG. 5A and FIG. 5B are enlarged top and front views of a disk cartridge.
Figure 5B:
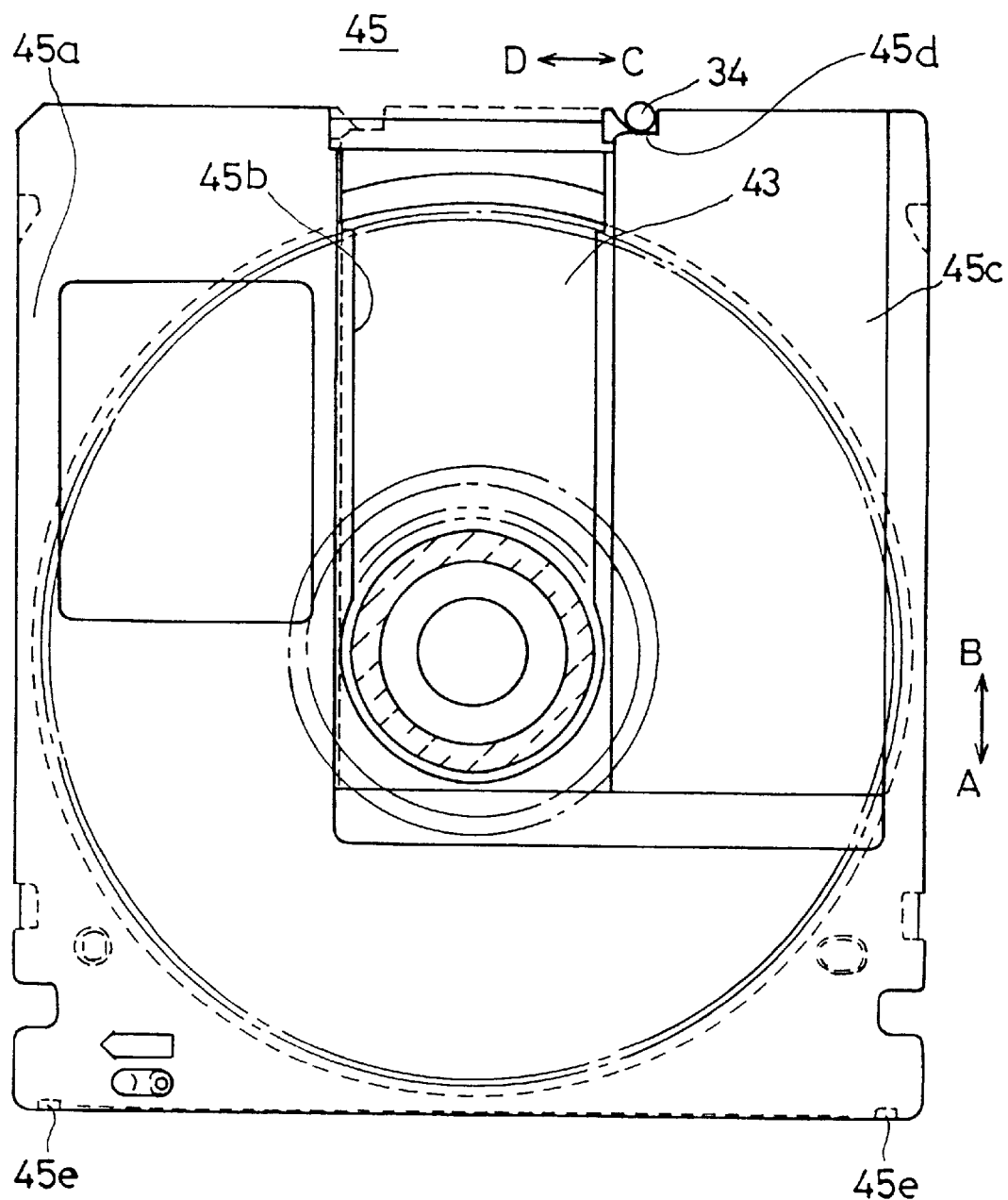

FIG. 5A and FIG. 5B shows a configuration of the disk cartridge 45.

As shown in FIG. 5A and FIG. 5B, the disk cartridge 45 comprises a case 45a which encloses the optical disk 43 therein. The case 45a has a front surface and a rear surface each of which includes a rectangular opening 45b. The openings 45b on the front and rear surfaces of the case 45a extend in a radial direction of the disk 43. The openings 45b in the case 45a allow the optical pickup unit 25 to access the disk 43 for recording or reproduction.

The disk cartridge 45 comprises a shutter 45c provided to open or close the openings 45b in the case 45a. The shutter 45c is attached to the case 45a, and the shutter 45c is movable relative to the case 45a in one of an opening direction, indicated by the arrow "C" in FIG. 5B, and a closing direction, indicated by the arrow "D" in FIG. 5B. When the cartridge 45 is not held on the disk tray 12, the shutter 45c is set at a closed position due to an actuating force of a spring (not shown) so that the openings 45b in the case 45a are closed by the shutter 45c. When the cartridge 45 is held on the disk tray 12 at the disk-loaded position, the shutter 45c is moved in the direction C and set at an open position by the shutter open/close unit 15 so that the openings 45b in the case 45a are open.

As shown in FIG. 1 and FIG. 3, a shutter arm 31 is provided at a rear end portion of the disk tray 12, and the shutter arm 31 is rotatably supported on the disk tray 12. When the cartridge 45 is held on the disk tray 12 at the disk-loaded position, the shutter arm 31 is actuated by the shutter open/close unit 15 so as to move the shutter 45c of the cartridge 45 to the open position.

The shutter arm 31 comprises a first arm 32, a second arm 33 and a connecting roller 34. The first arm 32 is rotatably supported at the rear end corner of the disk tray 12, and the first arm 32 is rotated clockwise in response to the rearward movement of the tray 12. The second arm 33 is rotatably linked to an end of the first arm 32, and the second arm 33 is rotated in accordance with the rotation of the first arm 32. The connecting roller 34 is provided at an end of the second arm 33, and the connecting roller 34 is connected to the shutter 45c of the disk cartridge 45. The connecting roller 34 is movable along a rear end wall of the disk tray 12 in one of the direction C and the direction D by the rotation of the shutter arm 31 in response to the forward and rearward movements of the tray 12.

In the disk apparatus 11 of the present embodiment, a plurality of disk supporting members 37 and the interlock unit 30 are provided. The interlock unit 30 includes a slide member 35 and a ring member 36.

In the present embodiment, the plurality of disk supporting members 37 are five disk supporting members 37a–37e which are arranged on the disk tray 12 in a radial formation around a center of the disk 43 or the disk cartridge 45 held on the tray 12, as shown in FIG. 1 and FIG. 3.

In the disk apparatus 11 of the present embodiment, the slide member 35 is moved relative to the chassis 22 in the direction B by the disk cartridge 45 when it is inserted in the disk tray 12. The slide member 35 is linked with the ring member 36. The ring member 36 is connected to each of the disk supporting members 37a–37e.

The slide member 35 is an L-shaped member which includes a first arm portion 35a, a second arm portion 35b, a cartridge contact portion 35c, and a link portion 35d. The first arm portion 35a extends from the rear end corner of the tray 12 in the direction A. The second arm portion 35b extends from a front end of the first arm portion 35a in the direction C. The link portion 35d is provided at the end of the second arm portion 35b, and this link portion 35d is linked with the ring member 36. The cartridge contact portion 35c is provided at a rear end of the first arm portion 35a. When the disk cartridge 45 is inserted in the disk tray 12, the edge of the cartridge 45 is brought into contact with the cartridge contact portion 35c so as to press the slide member 35 in the direction B. The slide member 35 is moved relative to the chassis 22 in the direction B.

In the slide member 35, two pairs of leg portions 35e are provided on the bottom of the first arm portion 35a. The disk tray 12 includes two pairs of guide grooves 12c at positions corresponding to the pairs of leg portions 35e. The leg portions 35e are fitted in the guide grooves 12c such that the slide member 35 is movable relative to the chassis 22 in one of the direction A and the direction B. A helical torsion spring 42 is fixed at one end to the chassis 22 and connected at the other end to the first arm portion 35a. The spring 42 exerts an actuating force on the slide member 35 so as to press the slide member 35 in the direction A.

As described above, when the disk cartridge 45 is inserted into the disk tray 12, the slide member 35 is pressed in the direction B by the contact between the cartridge 45 and the cartridge contact portion 35c. The slide member 35 is moved relative to the chassis 22 in the direction B by the cartridge 45 against the actuating force of the spring 42. As the link portion 35d is linked with the ring member 36, the ring member 36 is rotated clockwise around the center of the ring member 36 by the slide member 35.

As shown in FIG. 3, the ring member 36 is provided to encircle the outer periphery of the turntable 24. The ring formed by the ring member 36 is partially cut such that the optical pickup unit 25 is placed in the "cut" portion of the ring.

In the ring member 36, a plurality of leg portions 38a–38e are provided on the bottom of the ring member 36 at both the inner periphery and the outer periphery thereof. The disk tray 12 includes a plurality of guide grooves 39a–39e at positions adjacent to the leg portions 38a–38e. The leg portions 38a–38e are respectively fitted in the guide grooves 39a–39e such that the member 36 is slightly rotatable around the center of the ring member 36 relative to the chassis 22 in one of the clockwise direction and the counterclockwise direction.

At the outer periphery of the ring member 36, five contact portions 40a–40e are provided. The contact portions 40a–40e are respectively brought into contact with the disk supporting members 37a–37e to actuate the disk supporting members 37a–37e to the horizontal positions.

The disk supporting members 37a–37e are arranged on the disk tray 12 in a radial formation around the center of the ring member 36. A plurality of bearing portions 41a–41e are provided at the disk supporting a-members 37a–37e. Each of the disk supporting members 37a–37e is rotatably supported on the disk tray 12 by a respective one of the bearing portions 41a–41e.

FIG. 6A and FIG. 6B show a condition of one of the disk supporting members 37a–37e which is set at a vertical position. FIG. 7A and FIG. 7B show a condition of one of the disk supporting members 37a–37e which is set (or rotated 90 degrees) at a horizontal position.

The disk supporting members 37a–37e have the same configuration, and in FIGS. 6A–7B, one of the disk supporting members 37a–37e is designated by reference numeral 37 and a description thereof will now be given.

As shown in FIGS. 6A–7B, the disk supporting member 37 comprises a first shaft 46, a second shaft 47, and a supporting plate 48. The first shaft 46 and the second shaft 47 have a rotating axis and they are coaxial with each other. The supporting plate 48 extends sideways from each of the first shaft 46 and the second shaft 47 in parallel to the rotating axis of each of the first shaft 46 and the second shaft 47.

The supporting plate 48 is rotatable around the rotating axis of each of the first shaft 46 and the second shaft 47 between the vertical position and the horizontal position. The vertical position related to the supporting plate 48 is located above the first shaft 46 (or the second shaft 47) as shown in FIG. 6A, and the horizontal position related to the supporting plate 48 is located sideways of the first shaft 46 (or the second shaft 47) as shown in FIG. 7A.

The disk supporting member 37 has a width "Le" and a thickness "Ld". The width "Le" is rather greater than the thickness "Ld". The thickness "Ld" of the supporting plate 48 is substantially the same as an outer diameter of each of the first shaft 46 and the second shaft 47.

In the disk supporting member 37, a helical torsion spring 49 is provided on the second shaft 47, and a cut-out portion 50 is provided between the first shaft 46 and the second shaft 47 for enabling the spring 49 to be attached to the second shaft 47. The spring 49 exerts an actuating force on the supporting plate 48 such that the supporting plate 48 is maintained at the vertical position by the spring 49.

When the contact portions 40a–40e of the ring member 36 are separated from the disk supporting members 37a–37e, the supporting plate 38 of the disk supporting member 37 (for each of the disk supporting members 37a–37e) is set at the vertical position due to the actuating force of the spring 49. As shown in FIG. 6B, the supporting plate 38 of the disk supporting member 37 (for each of the disk supporting members 37a–37e) stands upright on the cartridge holding surface 12a of the disk tray 12 and supports the disk 43 which is inserted in the disk tray 12.

Figure 8A:
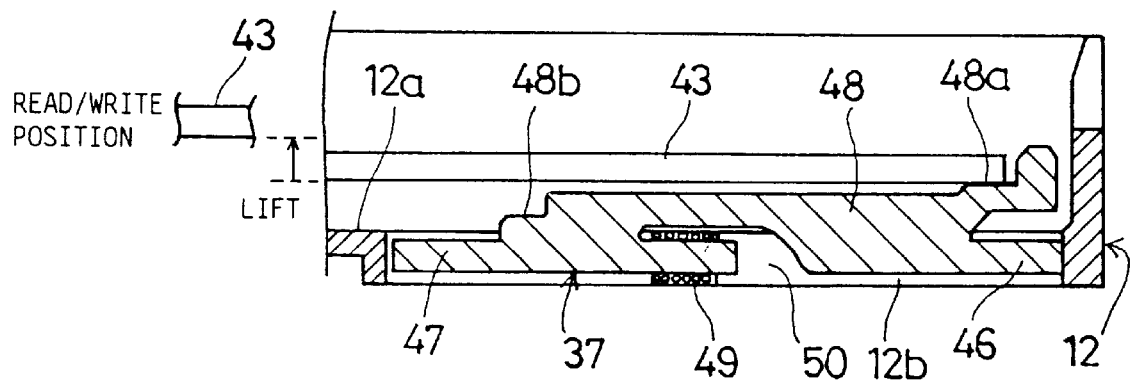
FIG. 8A through FIG. 8C are diagrams for explaining a respective condition of the disk apparatus in which one of a 12 cm diameter disk, a 8 cm diameter disk and the disk cartridge is held on the disk tray.
Figure 8B:
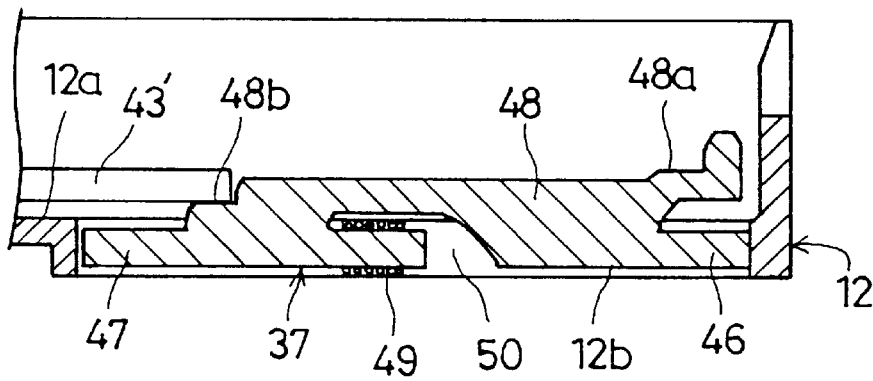
Figure 8C:
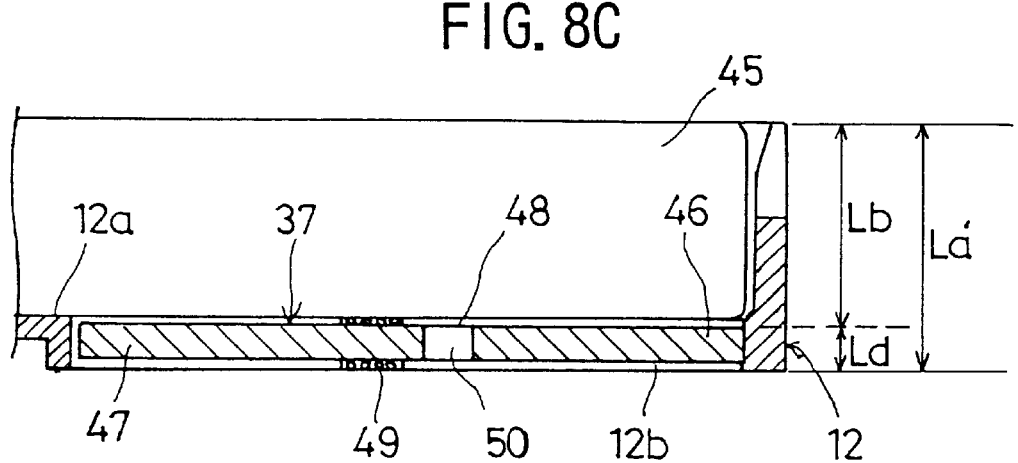

FIG. 8A through FIG. 8C show a respective condition of the disk apparatus 11 in which one of a 12 cm diameter disk, a 8 cm diameter disk and the disk cartridge 45 is held on the disk tray 12.

In the disk supporting member 37 of the present embodiment, the supporting plate 48 includes a first support surface 48a and a second support surface 48b. The disk 43 is usually the 12 cm diameter disk. When the disk 43 of this type is inserted in the disk tray 12, the first support surface 48a of the supporting plate 48 supports an outer periphery of the disk 43 thereon as shown in FIG. 8A.

Alternatively, the disk 43 may be a small-diameter optical disk 43' which is the 8 cm diameter disk. When the disk 43' is inserted in the disk tray 12, the second support surface 48b of the supporting plate 48 supports an outer periphery of the disk 43' thereon as shown in FIG. 8B. In the disk supporting member 37, the second support surface 48b is provided on the supporting plate 48 at a position which is lower than a position of the first support surface 48a. In the disk apparatus 11 of the present embodiment, either one of the disk 43 and the disk 43' having different diameters may be supported by the disk supporting member 37 on the disk tray 12, and recording or reproduction for a related disk may be carried out.

As described above, the thickness "Ld" of the supporting plate 48 is substantially the same as the outer diameter of each of the first shaft 46 and the second shaft 47. When the disk supporting member 37 is set (or rotated 90 degrees) at the horizontal position as shown in FIG. 7B, the supporting plate 48 is laid down on the disk tray 12 and the height of the disk supporting member 37 on the disk tray 12 is changed from "Le" to "Ld". The height "Ld" of the disk supporting member 37 on the disk tray 12 at this time is slightly lower than the height of the cartridge holding surface 12a on the disk tray 12. At this time, all the elements of the disk supporting member 37, including the first shaft 46, the second shaft 47 and the supporting plate 38, are included within an opening 12b of the disk tray 12. In other words, the disk supporting member 37 which is set at the horizontal position does not extend upward from the cartridge holding surface 12a of the disk tray 12.

In the disk supporting member 37, the first shaft 46 and the second shaft 47 are rotatably supported on the cartridge supporting surface 12a of the disk tray 12 by a respective one of the bearing portions 41a–41e.

When the disk cartridge 45 is inserted in the disk tray 12, as shown in FIG. 8C, the ring member 36 is rotated clockwise around the center of the ring member 36 by the slide member 35, and the contact portions 40a–40e of the ring member 36 are brought into contact with the second support surfaces 48b of the disk supporting members 37a–37e. The supporting plates 48 of the disk supporting members 37a–37e are rotated 90 degrees around the rotating axis of the first shaft 46 (or the second shaft 37) by the ring member 36. Thus, the disk supporting members 37a–37e are set at the horizontal positions on the disk tray 12 when the disk cartridge 45 is inserted in the disk tray 12. The contact portions 40a–40e of the ring member 36 at this time inhibit the supporting plates 48 of the disk supporting members 37a–37e from being upwardly rotated from the horizontal positions due to the actuating force of the springs 49. The supporting plates 48 of the disk supporting members 37a–37e when they are set at the horizontal positions are not in contact with the bottom of the disk cartridge 45. The disk cartridge 45, when inserted in the disk tray 12, can be smoothly placed on the cartridge holding surface 12a of the disk tray 12 without interfering with the disk supporting members 37 as shown in FIG. 8C.

Accordingly, in the disk supporting members 37a–37e of the present embodiment, the supporting plates 48 are set at the vertical positions on the disk tray 12 due to the actuating force of the springs 49. When the disk 43 (or the disk 43') is inserted in the disk tray 12, the disk supporting members 37a–37e stand upright on the disk tray 12 and the disk 43 is supported on the first support surfaces 48a of the supporting plates 48 (or the disk 43' is supported on the second support surfaces 48b thereof). On the other hand, when the disk cartridge 45 is inserted in the disk tray 12, the supporting plates 48 are set (or rotated 90 degrees) at the horizontal positions by the connection of the disk cartridge 45 and the interlock unit 30, and the supporting plates 38 are included in the openings 12b of the disk tray 12. The disk apparatus 11 of the present embodiment requires only the thickness "Ld" of the supporting plate 48 below the bottom of the disk cartridge 45 as the height of the disk supporting member 37 (which is set at the horizontal position) when the disk cartridge 45 is held on the disk tray 12 at the disk-loaded position.

The disk apparatus 11 of the present embodiment requires only that the entire thickness "La'" of the disk tray 12 is greater than a sum of the thickness "Lb" of the disk cartridge 45 and the thickness "Ld" of the supporting plate 48 as shown in FIG. 8C.

Figure 28:
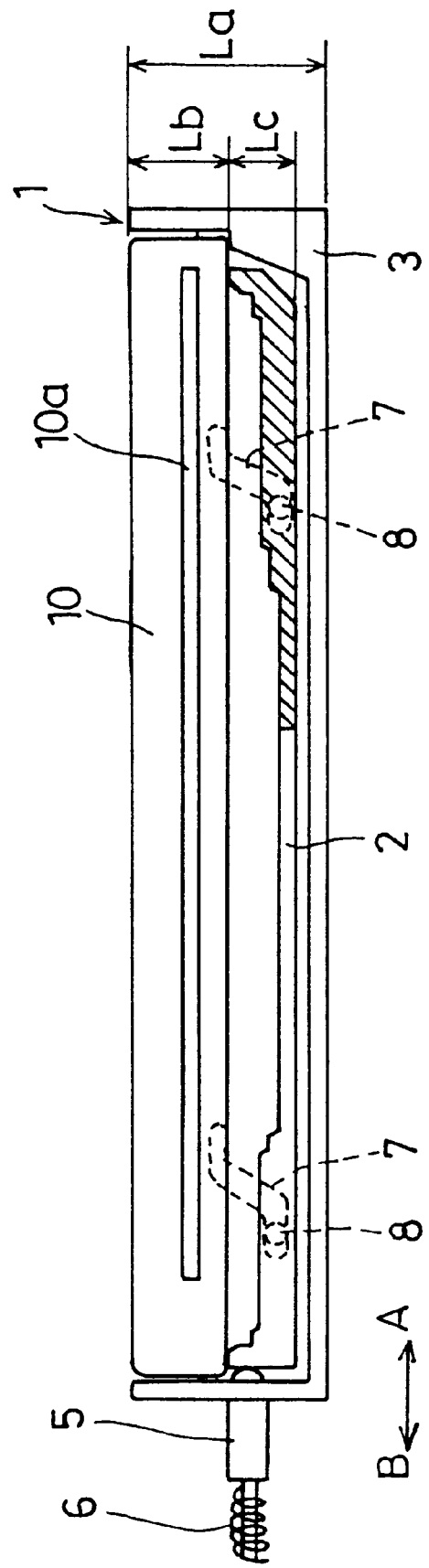
FIG. 28 is a cross-sectional view of the disk tray of the conventional disk apparatus in which the disk cartridge is inserted.

On the other hand, it is required for the previously-described conventional disk tray 1, as shown in FIG. 28, that the entire thickness "La" of the outer tray 3 is greater than the sum of the thickness "Lb" of the disk cartridge and the thickness "Lc" of the inner tray 2. The thickness "Lc" of the inner tray 2 is rather greater than the thickness "Ld" of the supporting plate 38 as the height of the disk supporting member 37 which is set at the horizontal position. The entire thickness "La'" of the disk tray 12 in the present embodiment can be reduced to a thickness rather smaller than the entire thickness "La" of the conventional disk tray 1. Therefore, the disk apparatus 11 of the present embodiment is effective in providing a thin structure for an optical disk drive installed in a notebook-size computer while the disk tray 12 is capable of holding one of the CD-ROM and the disk cartridge at the disk-loaded position.

Figure 9A:
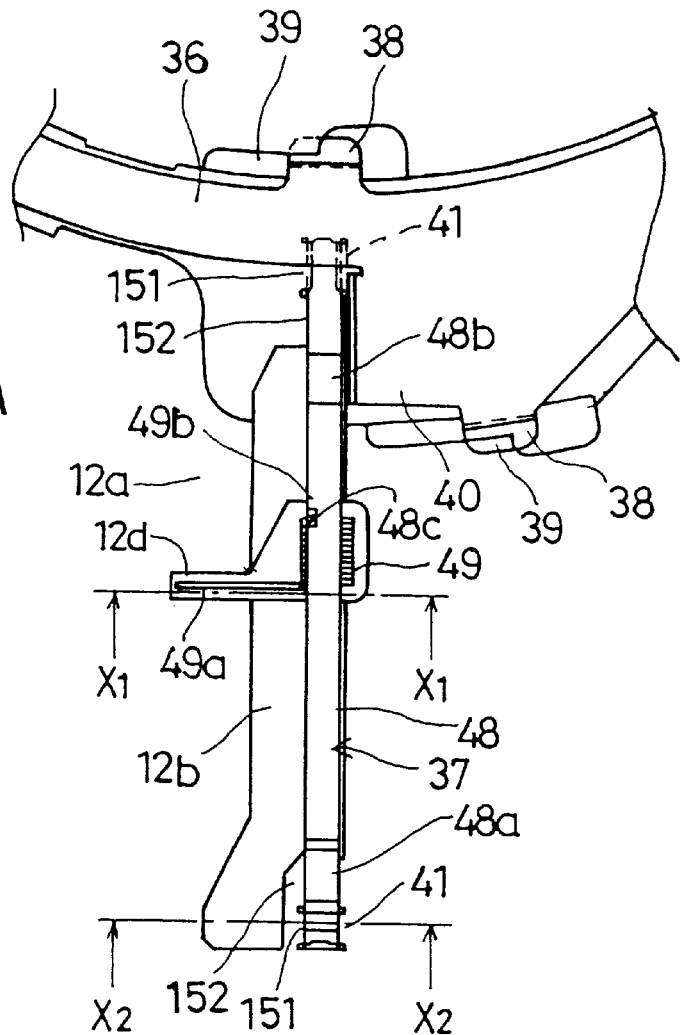
FIG. 9A through FIG. 9C are diagrams for explaining a condition of an interlock unit when the disk supporting member is set at the vertical position.
Figure 9B:
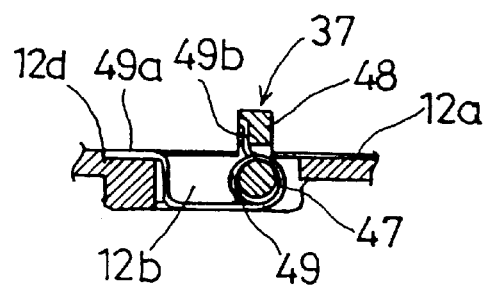
Figure 9C:
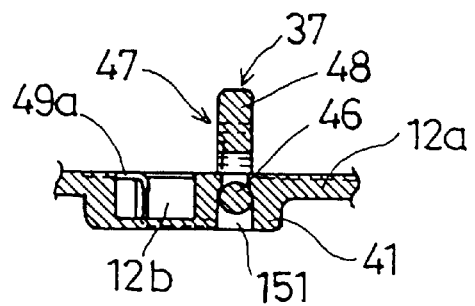
Figure 10A:
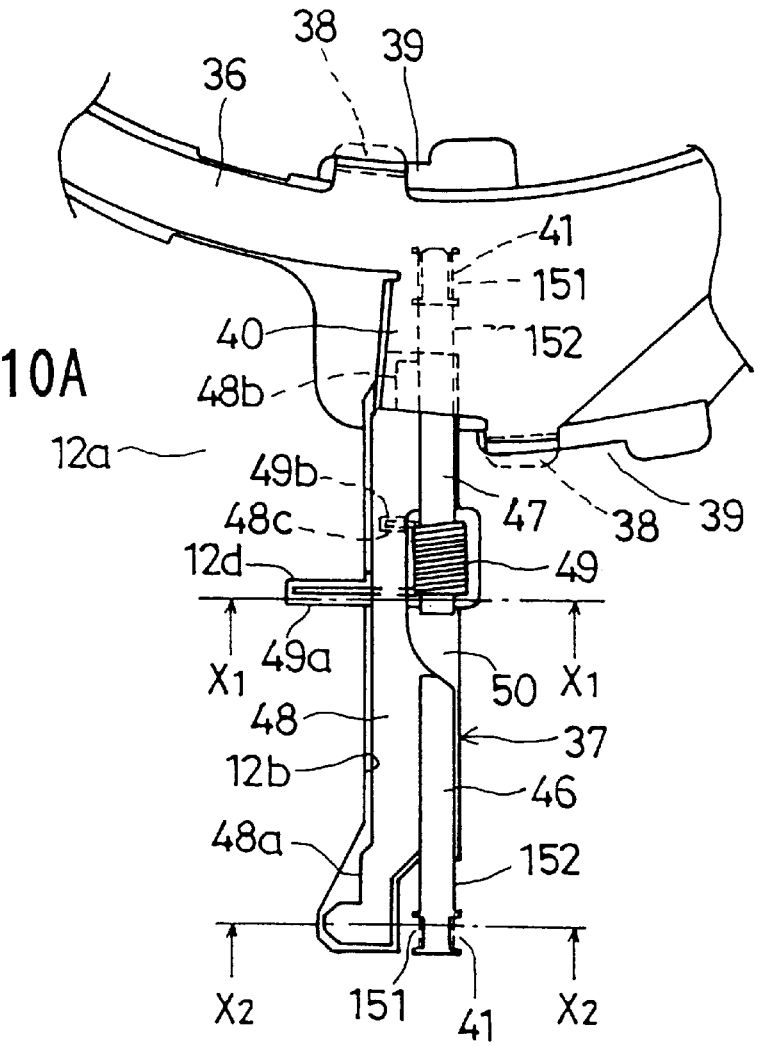
FIG. 10A through FIG. 10C are diagrams for explaining a condition of the interlock unit when the disk supporting member is set at the horizontal position.
Figure 10B:
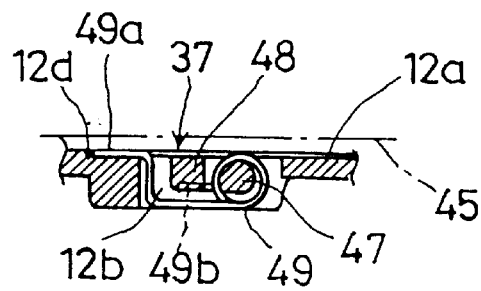
Figure 10C:
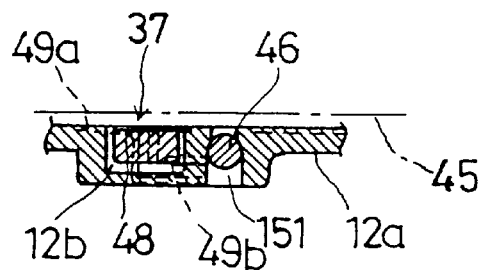

FIG. 9A through FIG. 9C show a condition of the interlock unit 30 when the disk supporting member 37 is set at the vertical position. FIG. 10A through FIG. 10C show a condition of the interlock unit 30 when the disk supporting member 37 is set (or rotated 90 degrees) at the horizontal position.

As described above, the disk supporting members 37a–37e have the same configuration, and in FIG. 9A through FIG. 10C, one of the disk supporting members 37a–37e is designated by reference numeral 37 and a description thereof will now be given.

FIG. 9B shows a cross section of the disk supporting member 37 taken along a line X1—-X1 indicated in FIG. 9A, and FIG. 9C shows a cross section of the disk supporting member 37 taken along a line X2—X2 indicated in FIG. 9A. Similarly, FIG. 10B shows a cross section of the disk supporting member 37 taken along a line X1-X1 indicated in FIG. 10A, and FIG. 10C shows a cross section of the disk supporting member 37 taken along a line X2—X2 indicated in FIG. 10A.

As shown in FIG. 9A and FIG. 10A, the opening 12b is formed in the cartridge supporting surface 12a of the disk tray 12 at a position adjacent to the disk supporting member 37. The opening 12b has a configuration in conformity with the disk supporting member 37. In the middle of the opening 12b of the disk tray 12, a spring retaining recess 12d is provided. One end 49a of the helical torsion spring 49 is fitted into the spring retaining recess 12d, and the spring 49 is fixed to the disk tray 12 by the connection of the spring end 49a and the recess 12d.

A spring retaining recess 48c is provided on the side of the supporting plate 48 of the disk supporting member 37. The spring 49 is provided on the second shaft 47 of the disk supporting member 37, and the other end 49b of the spring 49 is fitted into the spring retaining recess 48c. The spring 49 is connected to the supporting plate 48 by the connection of the spring end 49b and the recess 48c. Thus, the spring 49 exerts the actuating force on the supporting plate 48 such that the supporting plate 48 is maintained at the vertical position by the spring 49.

When the interlock unit 30 is in the condition shown in FIG. 9A through FIG. 9C, the supporting plate 48 of the disk supporting member 37 stands upright on the disk tray 12. The side of the second support surface 48b of the supporting plate 48 at this time is located close to or in contact with the contact portion 40 (or one of the contact portions 40a–40e) of the ring member 36.

As shown in FIG. 9A and FIG. 10A, the bearing portion 41 (or one of the bearing portions 41a–41e) rotatably supports the end of the first shaft 46 and the end of the second shaft 47 on the disk tray 12. The bearing portion 41 includes a bearing part 151 having an inverted U-shaped cross section and a bearing part 152 having a U-shaped cross section. The bearing part 151 and the bearing part 152 are located adjacent to each other and provided on the cartridge holding surface 12a of the disk tray 12 at each of the end of the first shaft 46 and the end of the second shaft 47. The bearing part 151 and the bearing art 152 prevent the first shaft 46 and the second shaft 47 from being separated from the disk tray 12, and the first shaft 46 and the second shaft 47 are rotatably supported on the disk tray 12 by the bearing portion 41.

As described above, the ring member 36 includes the leg portion 38 (or one of the leg portions 38a–38e) which is fitted into the guide groove 39 (or one of the guide grooves 39a–39e) of the disk tray 12. By the connection of the leg portion 38 and the guide groove 39, the ring member 36 is rotatably supported on the disk tray 12 such that the ring member 36 is rotatable around the center of the ring member 36, but a movement of the ring member 36 in a radial direction thereof is inhibited.

When the disk cartridge 45 is inserted in the disk tray 12 which is set at the disk-change position (shown in FIG. 1), the edge of the cartridge 45 is brought into contact with the cartridge contact portion 35c of the slide member 35. The slide member 35 is moved relative to the chassis 22 in the direction B by the cartridge 45 against the actuating force of the spring 42.

The slide member 35 is linked with the ring member 36 by the link portion 35d, and the ring member 36 is rotated clockwise around the center of the ring member 36 by the movement of the slide member 35. As shown in FIG. 10A, by the clockwise rotation of the ring member 36, the contact portion 40 (or each of the contact portions 40a–40e) moves the second support surface 48b of the disk supporting member 37 (or each of the disk supporting members 37a–37e) against the actuating force of the spring 49. Accordingly, the disk supporting member 37 is set (or rotated 90 degrees) at the horizontal position by the clockwise rotation of the ring member 36.

As described above, when the disk supporting member 37 (or each of the disk supporting members 37a–37e) is set at the horizontal position, all the elements of the disk supporting member 37, including the first shaft 46, the second shaft 47 and the supporting plate 38, are included within the opening 12b of the disk tray 12. In other words, the disk supporting member 37 which is set at the horizontal position does not extend upward from the cartridge holding surface 12a of the disk tray 12.

Further, when the disk supporting member 37 (or each of the disk supporting members 37a–37e) is set at the horizontal position, the contact portion 40 (or each of the contact portions 40a–40e) of the ring member 36 is located over the second support surface 48b of the supporting plate 48. The contact portion 40 of the ring member 36 at this time inhibits the supporting plate 48 of the disk supporting member 37 from being upwardly rotated from the horizontal position due to the actuating force of the springs 49. The supporting plate 48 of the disk supporting member 37 when it is set at the horizontal position is not in contact with the bottom of the disk cartridge 45. The disk cartridge 45, when inserted in the disk tray 12, can be smoothly placed on the cartridge holding surface 12a of the disk tray 12 without interfering with the disk supporting member 37.

The disk apparatus 11 of the present embodiment can be applied to not only the optical disk drive capable of holding one of a CD-ROM and a PD disk cartridge on a disk tray as in the above-described embodiment, but also a compact disk drive, a magnetic disk drive, a magneto-optical disk drive, and other optical disk drives.

Next, a description will be given of a second embodiment of the disk apparatus of the present invention.

Figure 11:
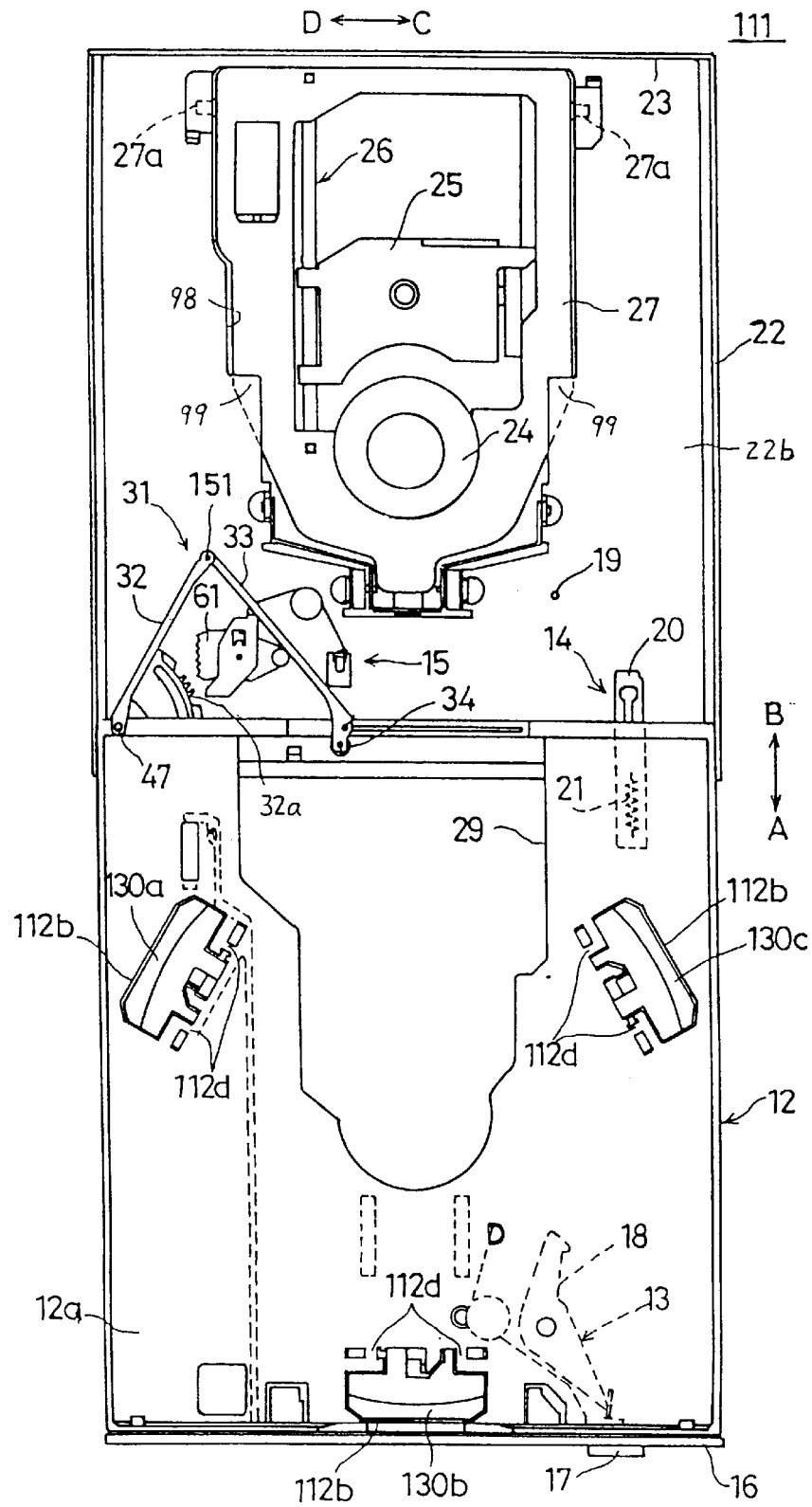
FIG. 11 is a top view of a second embodiment of the disk apparatus of the present invention in which a disk tray is pulled open.
Figure 12:
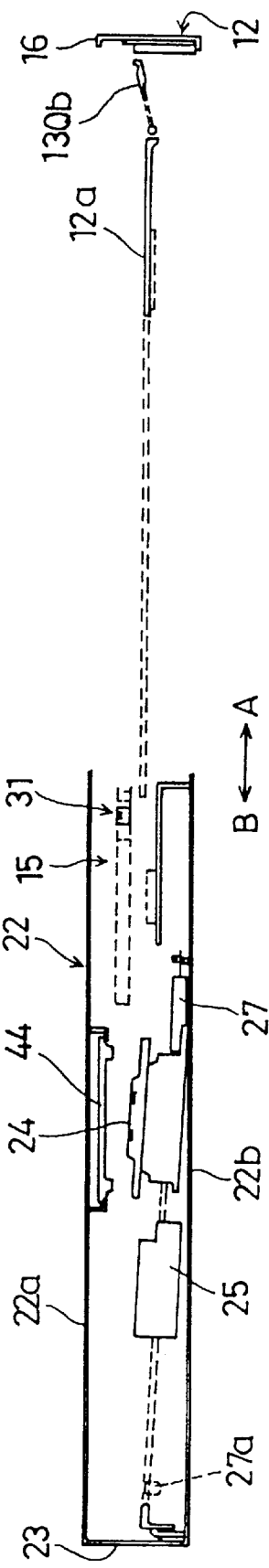
FIG. 12 is a cross-sectional view of the disk apparatus of FIG. 11.
Figure 13:
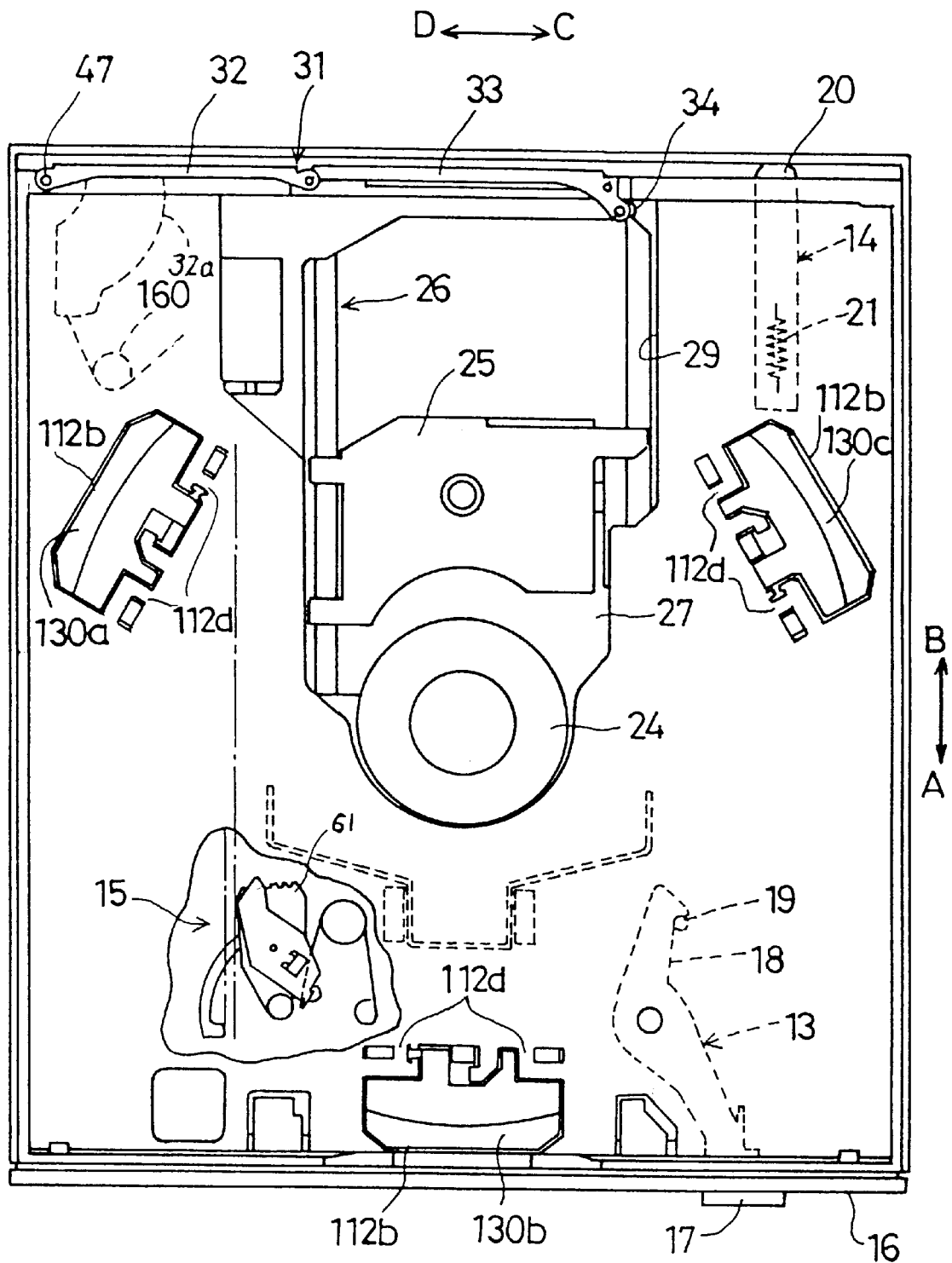
FIG. 13 is a top view of the disk apparatus of FIG. 11 in which the disk tray is inserted.
Figure 14:
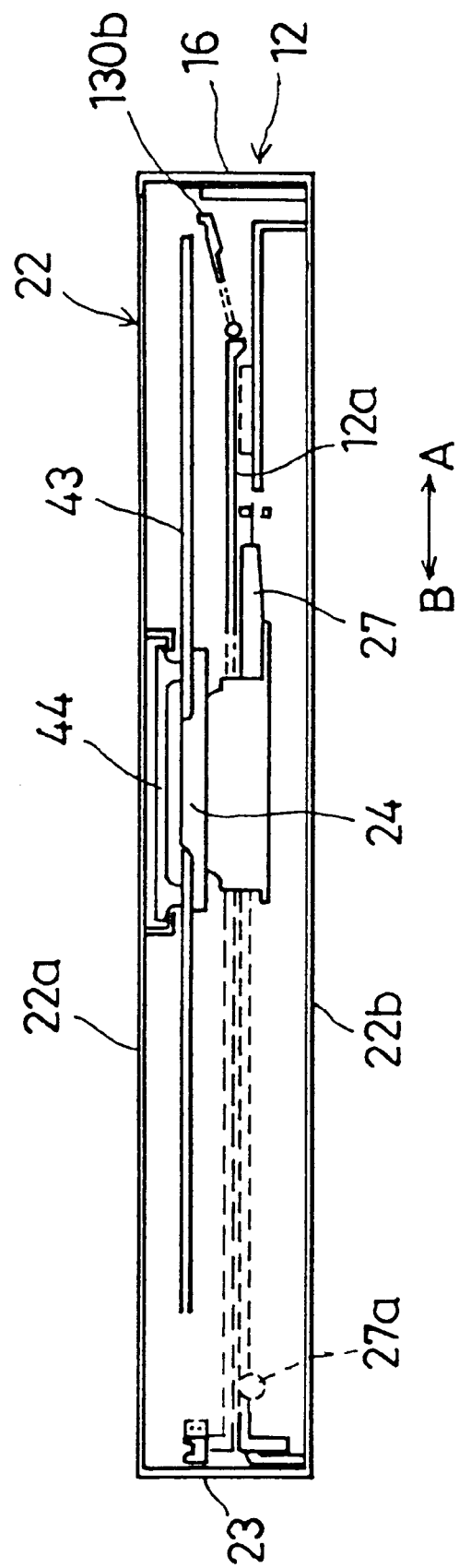
FIG. 14 is a cross-sectional view of the disk apparatus of FIG. 13.

FIG. 11 shows the second embodiment of the disk apparatus 111 of the present invention in which a disk tray is pulled open. FIG. 12 is a cross-sectional view of the disk apparatus 111. FIG. 13 shows the disk apparatus 111 in which the disk tray is inserted. FIG. 14 is a cross-sectional view of the disk apparatus 111.

In FIGS. 11–14, the elements which are the same as corresponding elements in FIGS. 1–4 are designated by the same reference numerals, and a duplicate description will be omitted.

In the disk apparatus 111 of the present embodiment, the disk tray 12 has the cartridge holding surface 12a on which the disk cartridge 45 is placed. The cartridge holding surface 12a includes the opening 29 which has a configuration in conformity with the turntable 24, the pickup unit 25 and the pickup drive 26.

In the disk apparatus 111 of the present embodiment, a plurality of disk supporting members 130 are provided on the disk tray around the periphery of the opening 29. In the present embodiment, the plurality of disk supporting members 130 are three disk supporting members 130a–130c which are arranged on the disk tray 12 in a radial formation around the center of the disk 43 or the cartridge 45 held on the tray 12, as shown in FIG. 11 and FIG. 13.

The disk tray 12 includes a plurality of openings 112b in the cartridge holding surface 12a which are arranged in a radial formation in conformity with the disk supporting members 130. In the present embodiment, the plurality of openings 112b are three openings arranged in a radial formation (or at 120-degree intervals) around the center of the disk 43 or the disk cartridge 45. As shown in FIG. 11 and FIG. 13, the disk supporting members 130a–130c are provided in the openings 112b.

The disk tray 12 includes a plurality of bearing portions 112d in the cartridge holding surface 12a which are respectively provided adjacent to the openings 112b. The disk supporting members 130a–130c have the same configuration, and they are rotatably supported on the cartridge holding surface 12a of the tray 12 by the bearing portions 112d. Each of the disk supporting members 130 has a helical torsion spring (not shown in FIG. 11 through FIG. 14), and the helical torsion spring exerts an actuating force on a respective one of the disk supporting members 130 such that the disk supporting members 130 are actuated to disk-support positions by the springs. When the disk supporting members 130 are set at the disk-support positions, the disk supporting members 130 extend upward from the openings 112b of the tray 12.

In the disk apparatus 111 of the present embodiment, when the disk cartridge 45 is inserted in the disk tray 12, the disk supporting members 130 are rotated downward to horizontal positions by a weight of the cartridge 45 against the actuating force of the springs. When the disk supporting members 130 are set at the horizontal positions, the disk supporting members 130 are included in the openings 112b of the tray 12.

Each of the disk supporting members 130 in the present embodiment is vertically rotatable around a rotating axis of a rotatable shaft between the disk-support position and the horizontal position.

Figure 15:
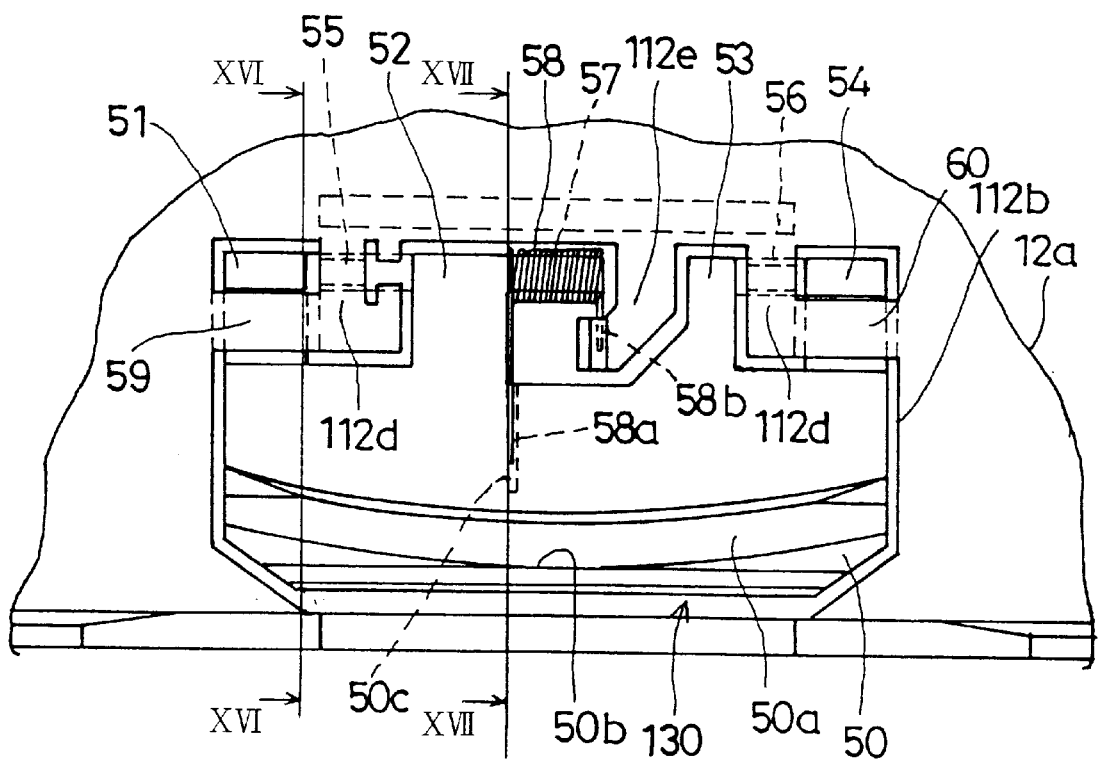
FIG. 15 is an enlarged top view of a disk supporting member provided on the disk tray in the disk apparatus of FIG. 11.
Figure 16:
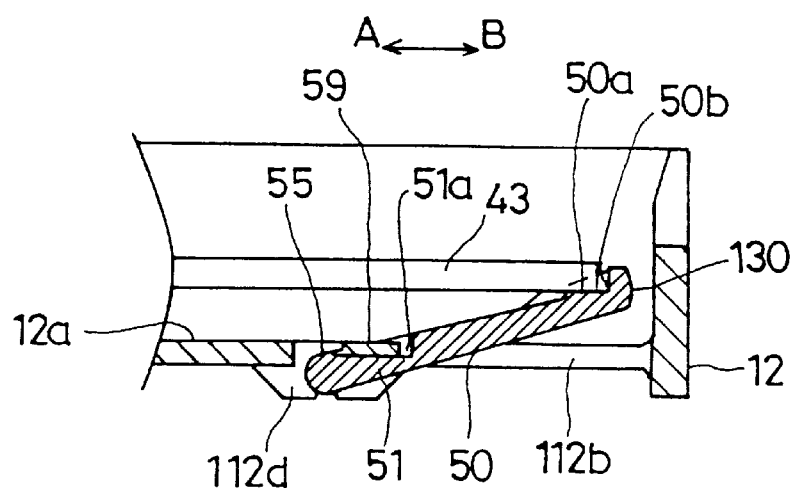
FIG. 16 is a cross-sectional view of the disk supporting member taken along a line XVI—XVI in FIG. 15.
Figure 17:
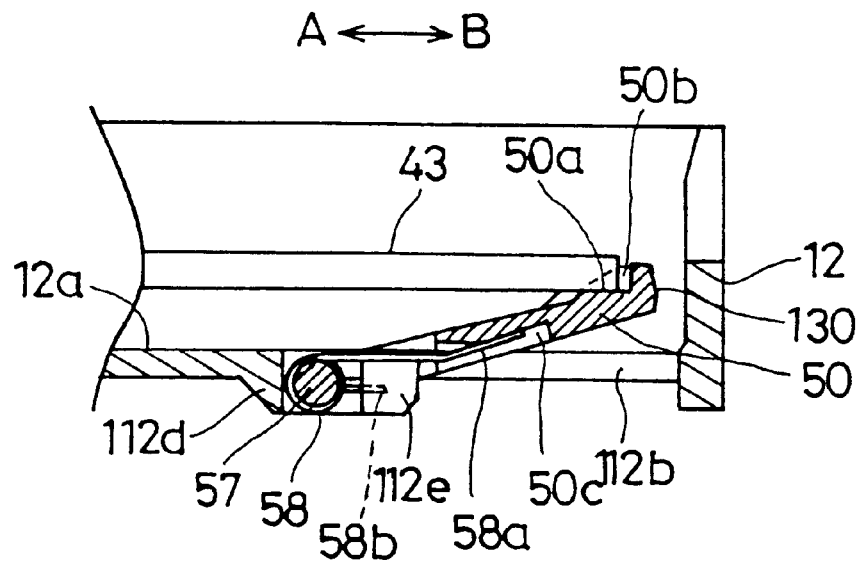
FIG. 17 is a cross-sectional view of the disk supporting member taken along a line XVII—XVII in FIG. 15.

FIG. 15 shows one of the disk supporting members 130 provided in the disk apparatus 111 of FIG. 11. FIG. 16 is a cross-sectional view of the disk supporting member taken along a line XVI—XVI in FIG. 15. FIG. 17 is a cross-sectional view of the disk supporting member taken along a line XVII—XVII in FIG. 15. In FIGS. 15–17, the disk supporting member 130 is set at the disk-support position.

As shown in FIG. 15, FIG. 16 and FIG. 17, the disk supporting member 130 in the present embodiment comprises a disk support plate 50, a first arm 51, a second arm 52, a third arm 53, a fourth arm 54, a first shaft 55, a second shaft 56, and a spring support portion 57. The disk support plate 50 extends upward from the opening 112b of the disk tray 12. The first through the fourth arms 51–54 extend inward from the disk support plate 50. The first shaft 55 is provided between the first arm 51 and the second arm 52.

The second shaft 56 is provided between the third arm 53 and the fourth arm 54. The spring support portion 57 extends sideways from the second arm 52 and provided between the second arm 52 and the third arm 53.

In the disk supporting member 130, the disk support plate 50 includes a disk contact surface 50a and an end wall 50b at an upper end of the disk support plate 50. When the disk 43 (or the CD-ROM) is inserted in the disk tray 12, the outer periphery of the disk 43 is brought into contact with the disk contact surface 50a. The end wall 50b is located outside the outer periphery of the disk 43 and extends upward from the disk contact surface 50a.

The disk contact surface 50a of the disk support plate 50 has a circular configuration in conformity with the outer periphery of the disk 43 as shown in FIG. 15. The disk contact surface 50a is formed as being flat in a vertical cross section as shown in FIG. 17. The outer periphery of the disk 43, when inserted, is supported on the disk contact surface 50a at a position that is higher than the cartridge holding surface 12a of the tray 12.

As shown in FIG. 15, the disk supporting member 130 has a helical torsion spring 58 provided on the spring support portion 57. The disk support plate 50 has a spring retaining recess 50c on the bottom of the disk support plate 50 in the middle thereof. One end 58a of the spring 58 is fitted into the spring retaining recess 50c. The disk tray 12 has a spring retaining portion 112e, and the spring retaining portion 112 extends downward from the cartridge holding surface 12a into the opening 112b. The other end 58b of the spring 58 is fitted into the spring retaining portion 112e. The spring 58 exerts an actuating force on the disk support plate 50 such that the disk support plate 50 is actuated upward to the disk-support position by the spring 58. The disk supporting member 130 extends upward from the opening 112b of the tray 12 as shown in FIG. 16.

In the present embodiment, a resulting force of the actuating forces of the springs 58 in the disk supporting members 130a–130c is predetermined as being smaller than the weight of the disk cartridge 45. When the disk cartridge 45 is inserted in the disk tray 12, the disk supporting members 130a–130c are rotated downward to the horizontal positions by the weight of the cartridge 45 against the actuating forces of the springs 58. When the disk supporting members 130a–130c are set at the horizontal positions, the disk supporting members 130a–130c are included in the openings 112b of the tray 12.

The disk supporting member 130 has an L-shaped stopper 59 on the left side of the opening 112b and an L-shaped stopper 60 on the right side of the opening 112b. The first arm 51 includes a contact surface 51a which is brought into contact with the bottom of the stopper 59. The disk support plate 50 (when the disk supporting member 130 is set at the disk-support position) is held at a predetermined angle to the horizontal direction (A or B) by the connection of the contact surface 51a and the stopper 59. Similarly, the fourth arm 54 includes a contact surface 54a which is brought into contact with the bottom of the stopper 60. The disk support plate 50 is held at the predetermined angle to the horizontal direction by the connection of the contact surface 54a and the stopper 60.

In the disk supporting member 130, the first shaft 55 and the second shaft 56 are rotatably supported on the disk tray 12 by the bearing portions 112d. The disk support plate 50 is vertically rotatable around the rotating axis of the first shaft 55 or the second shaft 56 between the disk-support position and the horizontal position.

When no disk is inserted in the disk tray 12, the disk supporting member 130 is set at the disk-support position as shown in FIGS. 16 and 17. The disk support plate 50 is actuated to the disk-support position by the actuating force of the spring 58. The first arm 51 and the fourth arm 54 are in contact with the stopper 59 and the stopper 60 respectively. The disk contact surface 50a of the disk support plate 50 is held in the horizontal condition to allow the disk 43 (or the CD-ROM), when inserted, to be supported on the disk contact surface 50a.

When the disk 43 (or the CD-ROM) is inserted in the disk tray 12 (which is pulled open as shown in FIGS. 11 and 12), the outer periphery of the disk 43 is placed on the disk contact surface 50a of the disk support plate 50 (for each of the disk supporting members 130a–130c). The disk 43 (or the CD-ROM) is held by the disk supporting members 130a–130c at a given position higher than the cartridge holding surface 12a of the disk tray 12.

Figure 18:
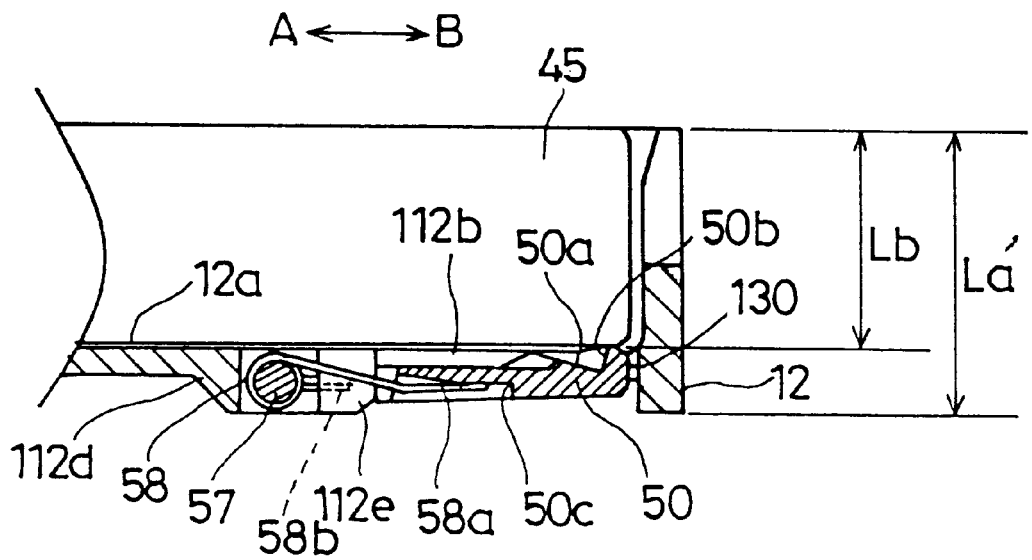
FIG. 18 is a diagram for explaining a condition of the disk apparatus in which the cartridge is inserted in the tray.

FIG. 18 shows a condition of the disk apparatus 111 in which the disk cartridge 45 is inserted in the disk tray 12.

When the disk cartridge 45 is inserted in the disk tray 12, the bottom of the cartridge 45 is brought into contact with the top of the disk supporting members 130a–130c. The disk supporting members 130a–130c are rotated around the rotating axis of the first shaft 55 (or the second shaft 56) downward to the horizontal positions by the weight of the cartridge 45 against the actuating force of the springs 58. When the disk supporting members 130a–130c are set at the horizontal positions, the disk supporting members 130a–130c are included in the openings 112b of the tray 12 and located below the top of the cartridge holding surface 12a.

As shown in FIG. 18, the cartridge 45 is held on the cartridge holding surface 12a of the tray 12. Accordingly, the disk apparatus 111 of the present embodiment requires only that the entire thickness "La'" of the disk tray 12 is greater than a sum of the thickness "Lb" of the disk cartridge 45 and a thickness of the disk support plate 50 as shown in FIG. 18.

The previously-described conventional disk tray 1 requires that, as shown in FIG. 28, the entire thickness "La" of the outer tray 3 is greater than the sum of the thickness "Lb" of the disk cartridge and the thickness "Lc" of the inner tray 2. The thickness "Lc" of the inner tray 2 is rather greater than the thickness of the disk support plate 50 as the height of the disk supporting member 130 which is set at the horizontal position. The entire thickness "La'" of the disk tray 12 in the present embodiment can be reduced to a thickness rather smaller than the entire thickness "La" of the conventional disk tray 1 (La'<La). Therefore, the disk apparatus 111 of the present embodiment is effective in providing a thin structure for an optical disk drive installed in a notebook-size computer while the disk tray 12 is capable of holding one of the CD-ROM and the disk cartridge at the disk-loaded position.

Next, a description will be given of disk loading and ejecting operations of the disk apparatus 111 when the disk cartridge 45 is inserted in the tray 12.

Similar to the disk apparatus 11 of FIGS. 1–4, the disk apparatus 111 of the present embodiment comprises the tray locking unit 13 which locks the disk tray 12 at the loaded position, the tray pressing unit 14 which presses the disk tray 12 in the ejecting direction A, and the shutter open/close unit 15 which opens and closes the shutter 45c of the disk cartridge 45.

When the disk tray 12 on which the disk cartridge 45 is held is moved from the disk-change position in the direction B, a gear 32a of the first arm 32 in the shutter open/close unit 15 is engaged with a rack 61 on the base 22b of the chassis 22. The first arm 32 is rotated clockwise around the read end corner of the tray 12. The second arm 33 is linked with the first arm 32 by a link 151, and the second arm 33 is rotated counterclockwise around the link 151. The connecting roller 34 moves the shutter 45c in the cartridge 45 in the direction C by the rotation of the second arm 33.

As shown in FIG. 13, the shutter arm 31 is set in a straight condition in which the first arm 32 and the second arm 33 extend along the rear end wall of the tray 12 in the direction C. When the shutter arm 31 is set in the straight condition, the shutter 45c in the disk cartridge 45 is fully opened by the connecting roller 34 (which is located at a recess 45d of the cartridge 45 as shown in FIG. 5B), and the disk 43 in the cartridge 45 is partially exposed. This enables the pickup unit 24 to get access to the disk 43 in the cartridge 45. Before the rear end wall of the tray 12 passes over the turntable 24 during the rearward movement of the tray 12, the shutter 45c in the cartridge 45 is fully opened by the connecting roller 34.

When the shutter 45c in the disk cartridge 45 is fully opened by the connecting roller 34, the shutter arm 31 is maintained in the straight condition due to an actuating force of a helical torsion spring 160.

When the disk tray 12 is further moved in the direction B to the disk-loaded position, the traverse unit 27 is moved upward, as shown in FIG. 14, and the turntable 24 provided on the traverse unit 27 brings the disk 43 (one of the CD-ROM and the disk cartridge 45) on the disk tray 12 into contact with the clamper 44. The clamper 44 is provided on the bottom side of the top plate 22a of the chassis 22, and the disk 43 at this time is clamped between the turntable 24 and the clamper 44. The pickup unit 25 is used to read data from or write data to the recording layer of the disk 43.

After the disk tray 12 on which the disk cartridge 45 is held is moved to the disk-loaded position, the operator may take the disk cartridge 45 out of the disk apparatus 111 by pressing the eject button 17 on the front bezel 16. When the eject button 17 is pressed by the operator, the tray locking unit 13 unlocks the disk tray 12. The lock lever 18 on the back side of the disk tray 12 is disconnected from the connecting pin 19 on the bottom surface of the chassis 22, so that the tray locking unit 13 unlocks the disk tray 12.

The tray pressing unit 14 includes the pressing lever 20 and the helical spring 21. When the tray locking unit 13 unlocks the disk tray 12, the pressing lever 20 pushes the rear end wall 23 of the chassis 22 due to the actuating force of the spring 21 so that the disk tray 12 is moved in the ejecting direction A by the pressing lever 20 toward the disk-change position. This operation of the tray pressing unit 14 allows the operator to pull the disk tray 12 open from the chassis 22 and set the disk tray at the disk-change position as shown in FIG. 11.

As the disk tray 12 is moved in the ejecting direction A by pressing the eject button 17 and the disk cartridge 45 passes over the turntable 24 after the pressing of the eject button 17, the shutter 45c in the cartridge 45 is closed by the shutter open/close unit 15 in accordance with a procedure which reverses the above-described procedure.

Figure 19:
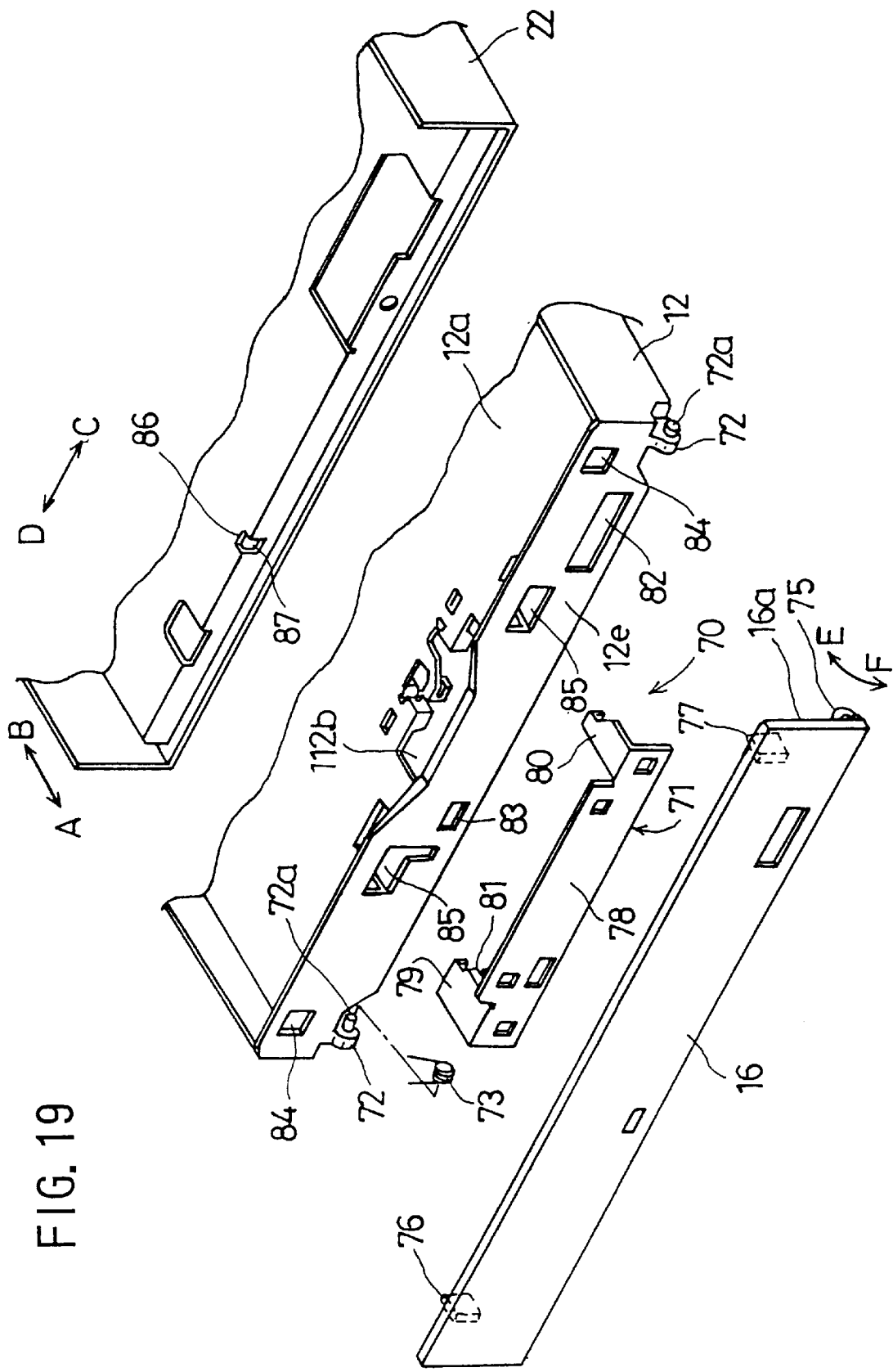
FIG. 19 is an exploded perspective view of a cartridge ejection unit in the disk apparatus.

Next, FIG. 19 shows a cartridge ejection unit 70 in the disk apparatus 111 of the present embodiment.

Figure 20:
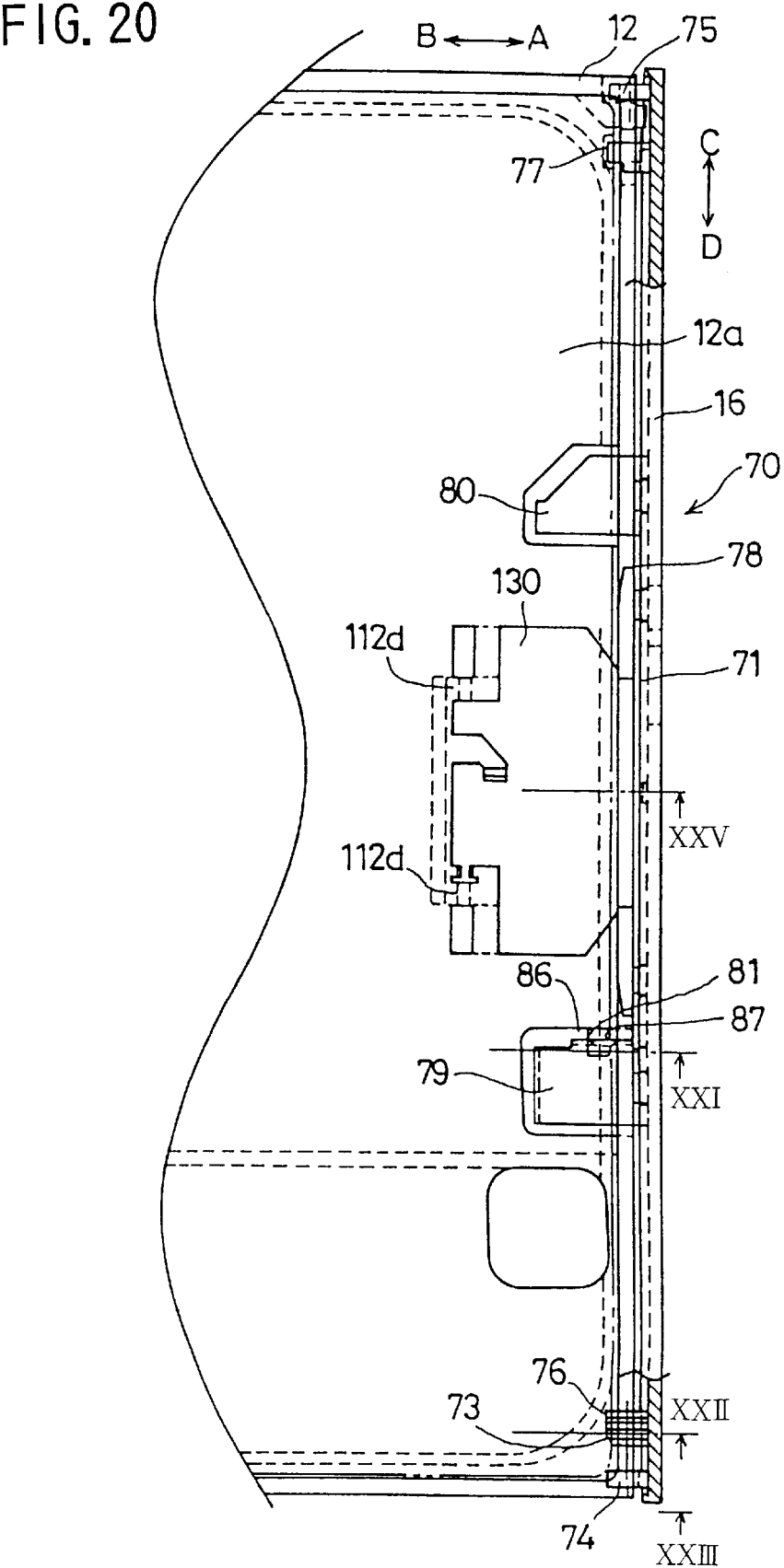
FIG. 20 is an enlarged top view of the cartridge ejection unit in the disk apparatus.
Figure 21:
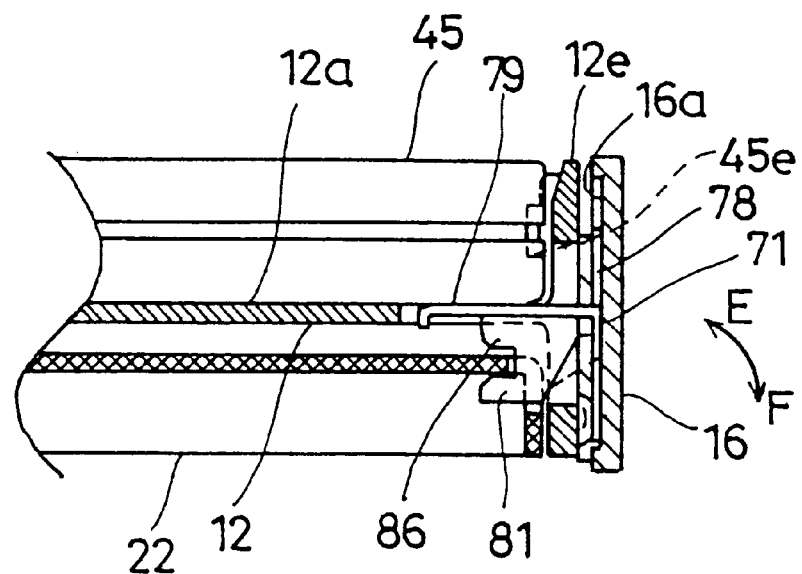
FIG. 21 is a cross-sectional view of the cartridge ejection unit taken along a line XXI indicated in FIG. 20.
Figure 22:
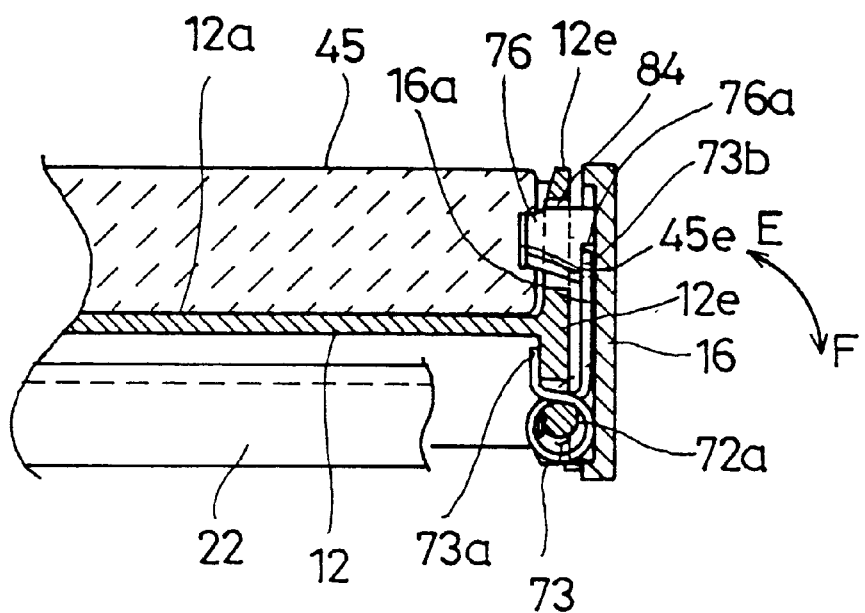
FIG. 22 is a cross-sectional view of the cartridge ejection unit taken along a line XXII indicated in FIG. 20.

FIG. 20 is an enlarged top view of the cartridge ejection unit 70 in the disk apparatus 111. FIG. 21 is a cross-sectional view of the cartridge ejection unit 70 taken along a line XXI indicated in FIG. 20, wherein the tray 12 is set at the disk-loaded position. FIG. 22 is a cross-sectional view of the cartridge ejection unit 70 taken along a line XXII indicated in FIG. 20, wherein the tray 12 is set at the disk-loaded position.

In FIGS. 19–22, the elements which are the same as corresponding elements in FIGS. 11–14 are designated by the same reference numerals, and a duplicate description thereof will be omitted.

As shown in FIGS. 19–22, the cartridge ejection unit 70 comprises the front bezel 16, a cartridge lifting member 71, a pair of supporting members 72, and a helical torsion spring 73.

The front bezel 16 is pulled open by the operator when taking the cartridge 45 out of the tray 12. The cartridge lifting member 71 is provided on the cartridge holding surface 12a of the tray 12, and the bottom of the cartridge 45, when inserted, is brought into contact with the cartridge lifting member 71. The supporting members 72 are provided at the front end corners of the tray 12 and rotatably support the front bezel 16 at both ends of the front bezel 16 such that the front bezel 16 is vertically rotatable around the supporting members 72 in one of an upward direction, indicated by the arrow E in FIG. 19, and a downward direction, indicated by the arrow F in FIG. 19. The spring 73 is provided on the tray 12 and exerts an actuating force on the front bezel 16 such that the front bezel 16 is rotated in the direction E to a front surface 12e of the tray 12 by the spring 73.

The front bezel 16 includes a pair of bearing portions 74 and 75 on an inside surface 16a of the front bezel 16, and a pair of retaining portions 76 and 77 on the inside surface 16a. The inside surface 16a confronts the front surface 12e of the tray 12. The supporting members 72 have a laterally extending shaft 72a on each of the supporting members 72. The shafts 72a of the supporting members 72 are fitted to the bearing portions 74 and 75 such that the front bezel 16 is rotatably supported on the shafts 72a. The retaining portions 76 and 77 are fitted into recesses 45e of the cartridge 45 when inserted, so as to ensure that the cartridge 45 is maintained at a given position in the tray 12 by the actuating force of the spring 73.

The cartridge lifting member 71, as shown in FIG. 19, includes a fixed plate 78, a pair of contact arms 79 and 80, and a retaining lug 81. The fixed plate 78 is fixed to the front bezel 16 in the middle of the inside surface 16a of the front bezel 16. The contact arms 79 and 80 extend from both ends of the fixed plate 78 in the direction B, and are brought into contact with the bottom of the cartridge 45 when inserted. The retaining lug 81 is provided on the side of the contact arm 79.

In the cartridge lifting member 71, the length of the contact arms 79 and 80 in the direction B is predetermined to such a length that the contact arms 79 and 80 touch the cartridge 45 when inserted but do not touch the disk 43 (the CD-ROM) when inserted. The contact arms 79 and 80 are provided away from the outer periphery of the disk 43 (the CD-ROM) held on the tray 12, so as to avoid interference with the recording layer of the disk 43 when inserted or when the front bezel 16 is erroneously pressed.

The front surface 12e of the tray 12, as shown in FIG. 19, includes an eject button hole 82, an LED hole 83, a pair of retainer holes 84, and a pair of contact arm holes 85. The eject button 17 is installed in the eject button hole 82. An LED (light emitting diode) indicator lamp (not shown) is installed in the LED hole 83. The retaining portions 76 and 77 of the front bezel 16 are inserted in the retainer holes 84. The contact arms 79 and 80 of the cartridge lifting member 71 are inserted in the contact arm holes 85.

The chassis 22, as shown in FIG. 19, includes a connecting portion 86 at a front edge of the chassis 22, and an opening 87 in which the connecting portion 86 is provided. When the tray 12 is set at the disk-loaded position, the retaining lug 81 of the cartridge lifting member 71 is fitted to the connecting portion 86 of the chassis 22. The opening 87 is provided to allow the retaining lug 81 to be smoothly fitted to the connecting portion 86 when the tray 12 is moved in the direction B to the disk-loaded position.

The spring 73 is provided on the shaft 72a of the supporting member 72 at the front left corner of the tray 12. One end 73a of the spring 73, as shown in FIG. 22, is fitted to the back side of the front surface 12e of the tray 12, and the other end 73b of the spring 73 is fitted to a groove 76a on the bottom of the retaining portion 76 of the front bezel 16. Thus, the spring 73 exerts the actuating force on the front bezel 16 such that the front bezel 16 is rotated in the direction E to the front surface 12e of the tray 12 by the spring 73.

As described above, when the tray 12 is set at the disk-loaded position, the lock lever 18 of the locking unit 13 is connected to the connecting pin 19 on the bottom of the tray 12. The tray 12 is locked at the disk-loaded position by the locking unit 13. At the same time, as shown in FIG. 21 and FIG. 22, the front bezel 16 is actuated in the direction E due to the actuating force of the spring 73, and the retaining lug 81 of the cartridge lifting member 71 fixed to the front bezel 16, is fitted to the connecting portion 86 of the chassis 22. Downward rotation of the front bezel 16 around the shafts 72a of the supporting members 72 in the direction F is inhibited by the connection of the retaining lug 81 and the connecting portion 86.

Accordingly, when the tray 12 on which the cartridge 45 is held is set at the disk-loaded position, the front bezel 16 on the front surface 12e of the tray 12 is locked by the connection of the retaining lug 81 and the connecting portion 86. This makes it impossible for the operator to take the cartridge 45 out of the tray 12 by pulling the front bezel 16 in the direction F. Even if the front bezel 16 is erroneously pulled by the operator, the cartridge ejection unit 70 in the disk apparatus 11 serves to inhibit the cartridge 45 from being taken out of the tray 12 when the tray 12 is set at the disk-loaded position.

Further, when the tray 12 on which the cartridge 45 is held is set at the disk-loaded position, the retaining portions 76 and 77 in the cartridge ejection unit 70 are snugly fitted into the recesses 45e of the cartridge 45. The cartridge 45 is held at the given position in the tray 12 by the actuating force of the spring 73, which ensures that the cartridge 45 does not rattle in the tray 12. As the center of the disk 43 in the cartridge 45 held on the tray 12 substantially accords with the center of the turntable 24 on the chassis 22, the disk 43 in the cartridge 45 is clamped between the turntable 24 and the damper 44 when the traverse unit 27 is moved up in response to the rearward movement of the tray 12.

Further, when the tray 12 on which the cartridge 45 is held is set at the disk-loaded position, the retaining portions 76 and 77 in the cartridge ejection unit 70 are fitted into the recesses 45e of the cartridge 45. The cartridge 45 is held at the given position in the tray 12 by the actuating force of the spring 73. The disk supporting members 130 are rotated downward to the horizontal positions by the weight of the cartridge 45. When the disk supporting members 130 are set at the horizontal positions, the disk supporting members 130 are included in the openings 112b of the tray 12 and located below the top of the cartridge holding surface 12a.

Further, the connection of the retaining portions 76 and 77 and the recesses 45e, as described above, serves to prevent the cartridge 45 from being lifted above the cartridge holding surface 12a of the tray 12 due to the actuating force of the springs 58 when the tray 12 is set at the disk-loaded position.

Next, a description will be given of a cartridge ejection operation of the cartridge ejection unit 70 in the disk apparatus 111.

Figure 23:
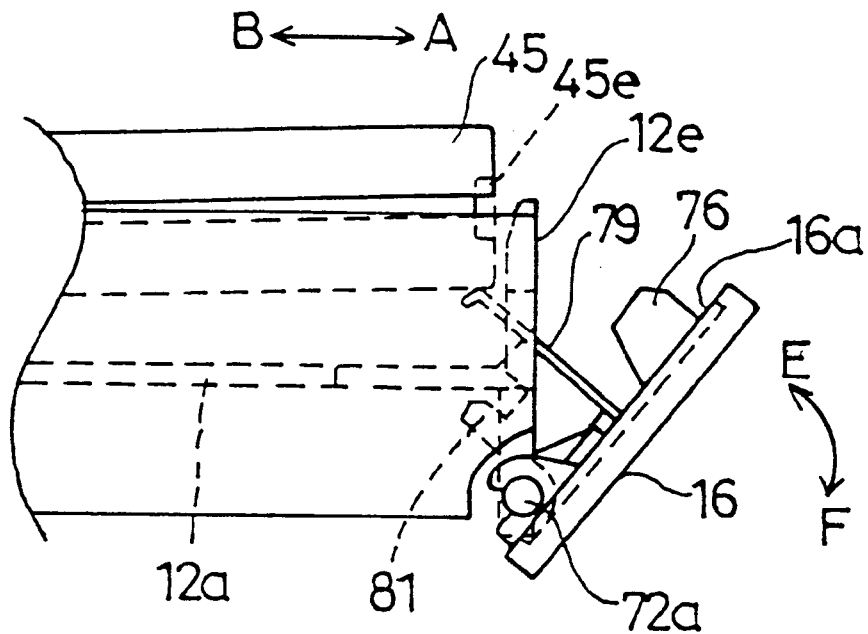
FIG. 23 is a cross-sectional view of the cartridge ejection unit taken along a line XXIII indicated in FIG. 20.
Figure 24:
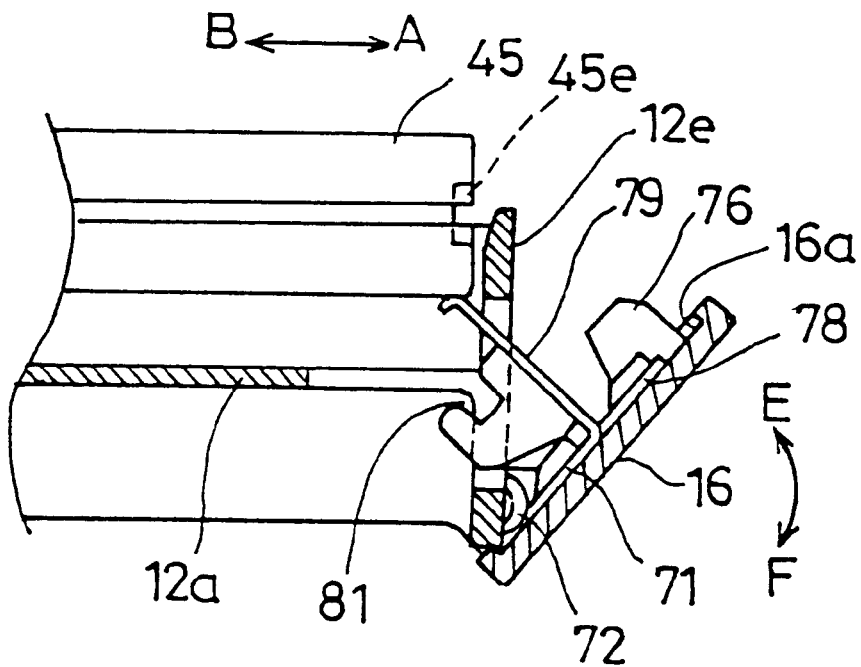
FIG. 24 is a diagram for explaining an operation of the cartridge ejection unit shown in FIG. 21.
Figure 25:
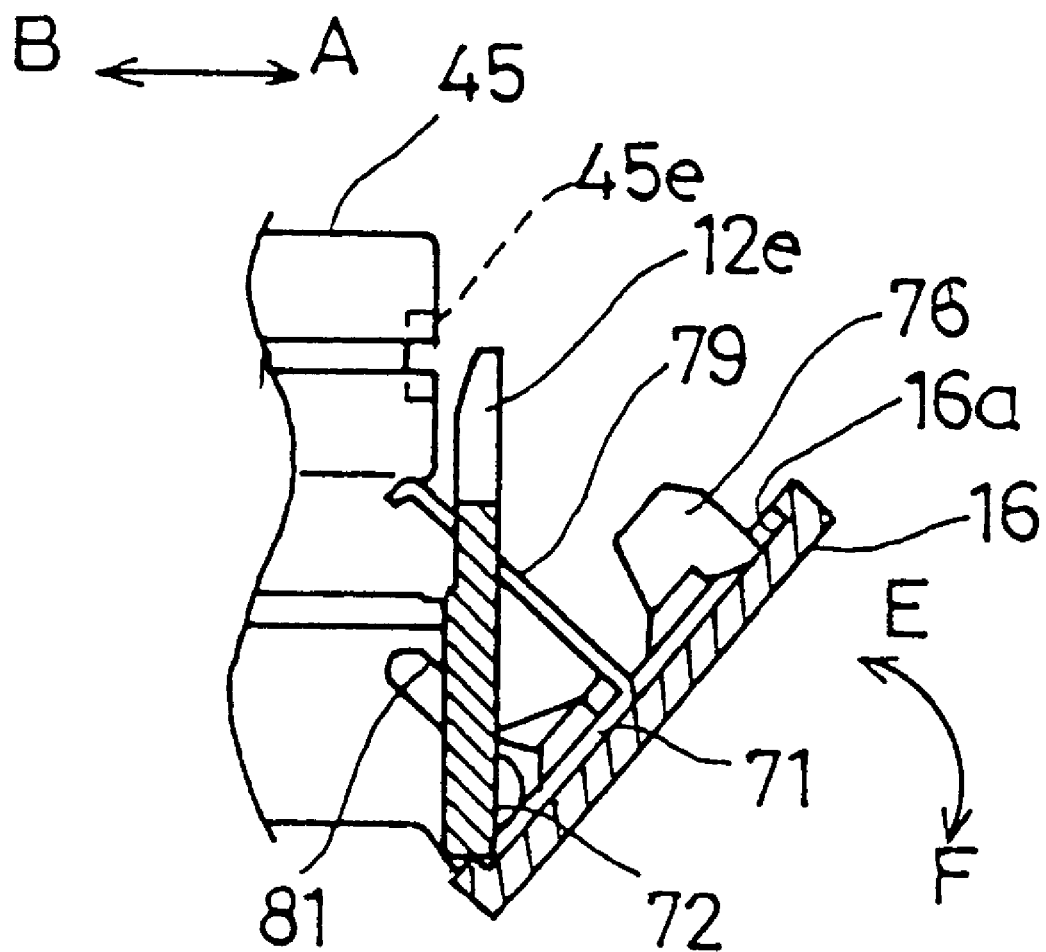
FIG. 25 is a cross-sectional view of the cartridge ejection unit taken along a line XXV indicated in FIG. 20.
Figure 26:
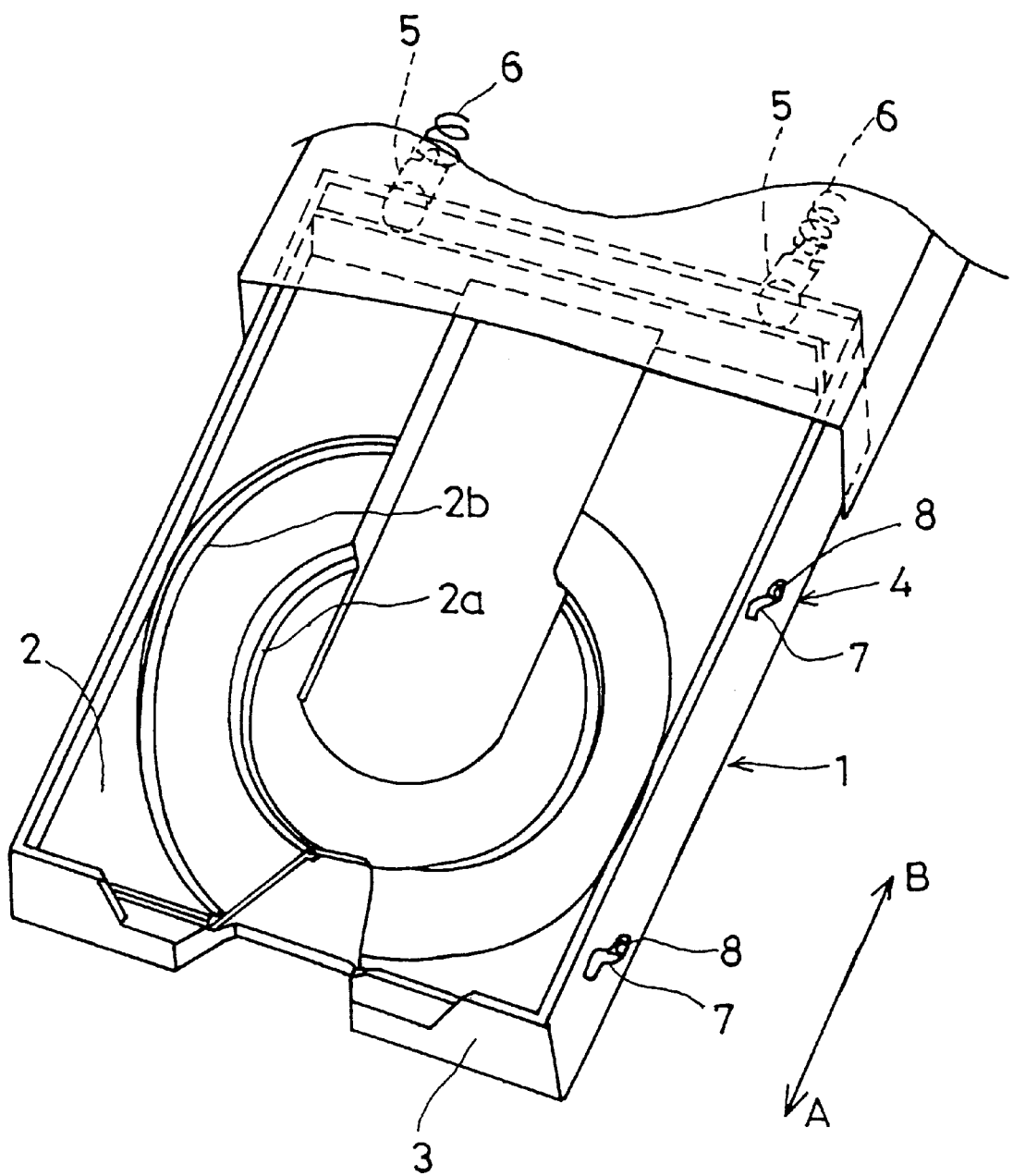
FIG. 26 is a perspective view of a conventional disk apparatus in which either a CD-ROM or a PD disk cartridge can be held on a disk tray at a loaded position.
Figure 27:
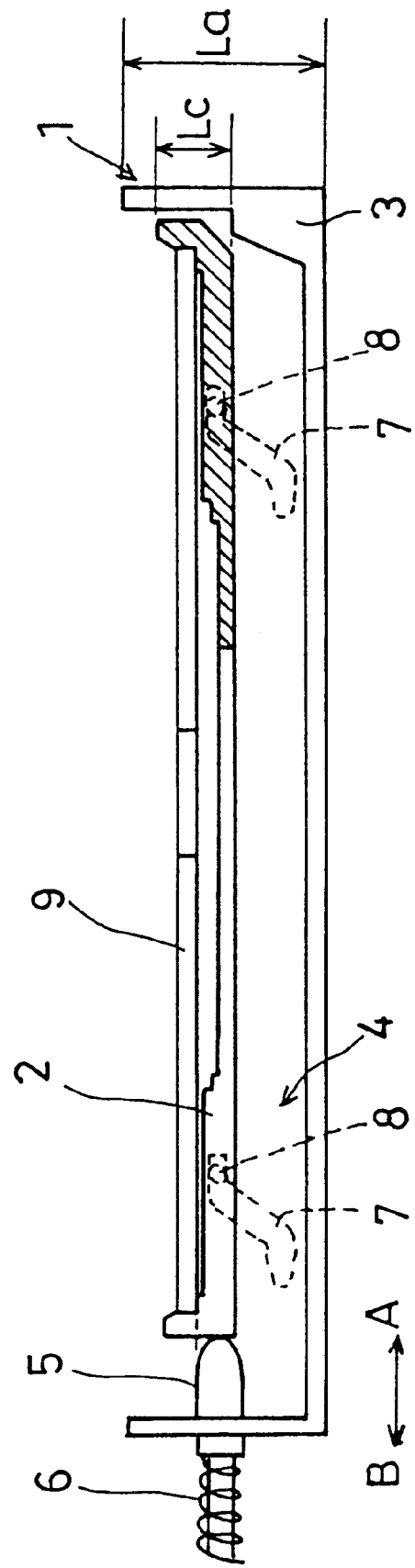
FIG. 27 is a cross-sectional view of the disk tray of the conventional disk apparatus in which the CD-ROM is inserted.

FIG. 23 is a cross-sectional view of the cartridge ejection unit 70 taken along a line XXIII indicated in FIG. 20. FIG. 24 shows an operation of the cartridge ejection unit 70 of FIG. 21. FIG. 25 is a cross-sectional view of the cartridge ejection unit 70 taken along a line XXV indicated in FIG. 20.

In FIGS. 23–25, the elements which are the same as corresponding elements in FIGS. 11–14 are designated by the same reference numerals, and a duplicate description thereof will be omitted.

When the tray 12 is set at the disk-change position, the retaining lug 81 in the cartridge ejection unit 70 is disconnected from the connecting portion 86 of the chassis 22. The front bezel 16 is rotatable around the shafts 72a of the supporting members 72. In order to take the cartridge 45 out of the tray 12, the operator pulls the front bezel 16 in the direction F so that the front bezel 16 is rotated downward as shown in FIGS. 23–25.

As the front bezel 16 is rotated around the shafts 72a of the supporting members 72 in the direction F, the cartridge lifting member 71, fixed to the inside surface 16a of the front bezel 16, is also rotated around the shafts 72a in the direction F together with the front bezel 16. By this rotation of the cartridge lifting member 71, the contact arms 79 and 80 are moved up in the direction F. As the contact arms 79 and 80 are in contact with the bottom of the cartridge 45 on the tray 12, the front portion of the cartridge 45 is lifted by the contact arms 79 and 80. By the upward movement of the contact arms 79 and 80, the front portion of the cartridge 45 is separated from the cartridge holding surface 12a of the tray 12 and lifted at a position higher than the cartridge holding surface 12a of the tray 12.

As the front portion of the cartridge 45 is lifted at the higher position on the tray 12 by the cartridge ejection unit 70, the operator can easily take the cartridge 45 out of the tray 12. The contact arms 79 and 80 in contact with the bottom of the cartridge 45 are smoothly moved up by the rotation of the front bezel 16 around the shafts 72a in the direction F when the front bezel 16 is pulled by the operator, and the cartridge ejection unit 70 in the disk apparatus 111 provides a good operability for the operator. The operator requires only a small operating force to pull the front bezel 16 in the direction F, and the cartridge 45, which is lifted at the higher position on the tray 12, can be easily taken out of the tray 12 by the operator without using a great operating force.

As described above, in the disk apparatus 111 of the present embodiment, the front portion of the cartridge 45 is lifted at the higher position on the tray 12 by the cartridge ejection unit 70, and the operator can easily take the cartridge 45 out of the tray 12. It is not necessary to make the entire thickness of the disk tray greater in order to increase the strength of the disk apparatus as in the existing optical disk drives. The disk apparatus 111 of the present embodiment is effective in providing a thin structure for an optical disk drive installed in a notebook-size computer while the disk tray 12 is capable of holding one of the CD-ROM and the disk cartridge at the disk-loaded position.

In the disk apparatus 111 of the present embodiment, disk loading and ejecting operations when the CD-ROM (or the disk 43) is inserted in the tray 12 are the same as the disk loading and ejecting operations of the disk apparatus 111 when the disk cartridge 45 is inserted in the tray 12, except for the operation of the shutter open/close unit 15.

The disk apparatus 111 of the present embodiment can be applied to not only the optical disk drive capable of holding one of a CD-ROM and a PD disk cartridge on a disk tray as in the above-described embodiment, but also a compact disk drive, a magnetic disk drive, a magneto-optical disk drive, and other optical disk drives.

Further, the present invention is not limited to the above-described embodiments, and variations and modifications may be made without departing from the scope of the present invention.

What is claimed is:

1. A disk apparatus comprising:

a disk tray for holding one of a disk and a disk cartridge at a loaded position, the disk having a first thickness, the cartridge having a second, greater thickness;

a plurality of disk supporting members provided on the tray for supporting one of the disk and the cartridge thereon, each of the plurality of disk supporting members comprising a rotatable shaft and a supporting plate, each of the supporting plates extending parallel to the respective shaft and being rotatable around a rotating axis of the respective shaft between a vertical position, located above the respective shaft, and a horizontal position, located sideways of the respective shaft; and an interlock unit provided on the tray for rotating each of the supporting plates of each of the plurality of disk supporting members around the rotating axis of the respective shaft from the vertical position to the horizontal position when the cartridge is inserted in the tray, wherein each of said supporting plates at the vertical position supports the disk thereon when the disk is inserted in the tray, and each of said supporting plates is set at the horizontal position when the cartridge is inserted in the tray.

2. The disk apparatus according to claim 1, wherein said tray has a cartridge holding surface at a predetermined height on the tray, each of said supporting plates has a thickness smaller than the predetermined height, and a height of each of said supporting plates on the tray, when each of the supporting plates is set at the horizontal position and the cartridge is held on the cartridge holding surface, is lower than the predetermined height.

3. The disk apparatus according to claim 1, wherein the shafts of the plurality of disk supporting members are rotatably supported on the tray and arranged in a radiation formation around a center of one of the disk and the cartridge held on the tray.

4. The disk apparatus according to claim 1, wherein each of the plurality of disk supporting members further comprises a spring connected to the respective supporting plate, said spring exerting an actuating force on the supporting plate such that the supporting plate is actuated to the vertical position by the spring.

5. The disk apparatus according to claim 1, wherein each of said supporting plates comprises a first support surface and a second support surface, the first support surface supporting an outer periphery of the disk thereon, the disk having a first diameter, the second support surface supporting an outer periphery of a small-size disk thereon, the small-size disk having a second diameter smaller than said first diameter.

6. The disk apparatus according to claim 1, wherein said interlock unit comprises a slide member and a ring member, said slide member provided to be movable in a predetermined direction of the tray by the cartridge when inserted in the tray, said ring member being linked with the slide member and rotated by a movement of the slide member, and said ring member having a plurality of contact portions connected to the plurality of disk supporting members.

7. The disk apparatus according to claim 6, wherein, when the supporting plate of each of the plurality of disk supporting members is set at the horizontal position, each of the plurality of contact portions inhibits the supporting plate from being rotated upward to the vertical position so as to avoid interference between the cartridge and the supporting plate when the cartridge is inserted in the tray.

8. A disk apparatus comprising:

a disk tray for holding one of a disk and a disk cartridge at a disk-loaded position, the disk having a first thickness, the cartridge having a second, greater thickness, the tray having a cartridge holding surface at a predetermined height on the tray, the tray being movable between a disk-change position and the disk-loaded position; and a plurality of disk supporting members provided on the tray for supporting one of the disk and the cartridge thereon, each of the plurality of disk supporting members comprising a rotatable shaft and a disk support plate, each of the disk support plates having a disk contact surface to support an outer periphery of the disk thereon, each of the disk support plates being rotatable around a rotating axis of the respective shaft between a disk-support position, located above the cartridge holding surface, and a horizontal position, located below the cartridge holding surface, wherein each of the disk support plates is rotated from the disk-support position to the horizontal position by the cartridge when the cartridge is inserted in the tray, each of said disk support plates at the horizontal position being placed below the cartridge holding surface in the tray.

9. The disk apparatus according to claim 8, wherein each of the plurality of disk supporting members is provided on the cartridge holding surface of the tray and each of said shafts is rotatably supported on the cartridge holding surface.

10. The disk apparatus according to claim 8, wherein each of the plurality of disk supporting members further comprises a spring connected to the respective disk support plate, said spring exerting an actuating force on the disk support plate such that the disk support plate is actuated to the disk-support position by the spring.

11. The disk apparatus according to claim 10, wherein a resultant force of the actuating forces of the springs of the plurality of disk supporting members is predetermined as being smaller than a weight of the cartridge.

12. The disk apparatus according to claim 8, wherein, when the disk support plate of each of the plurality of disk supporting members is set at the disk-support position, the disk contact surface of each of the disk support plates is located at a predetermined position above the cartridge holding surface in the tray.

* * * * *